Oct. 27, 1936.       C. W. HAZELETT       2,058,447
METALWORKING PROCESS
Filed May 16, 1932       16 Sheets—Sheet 1
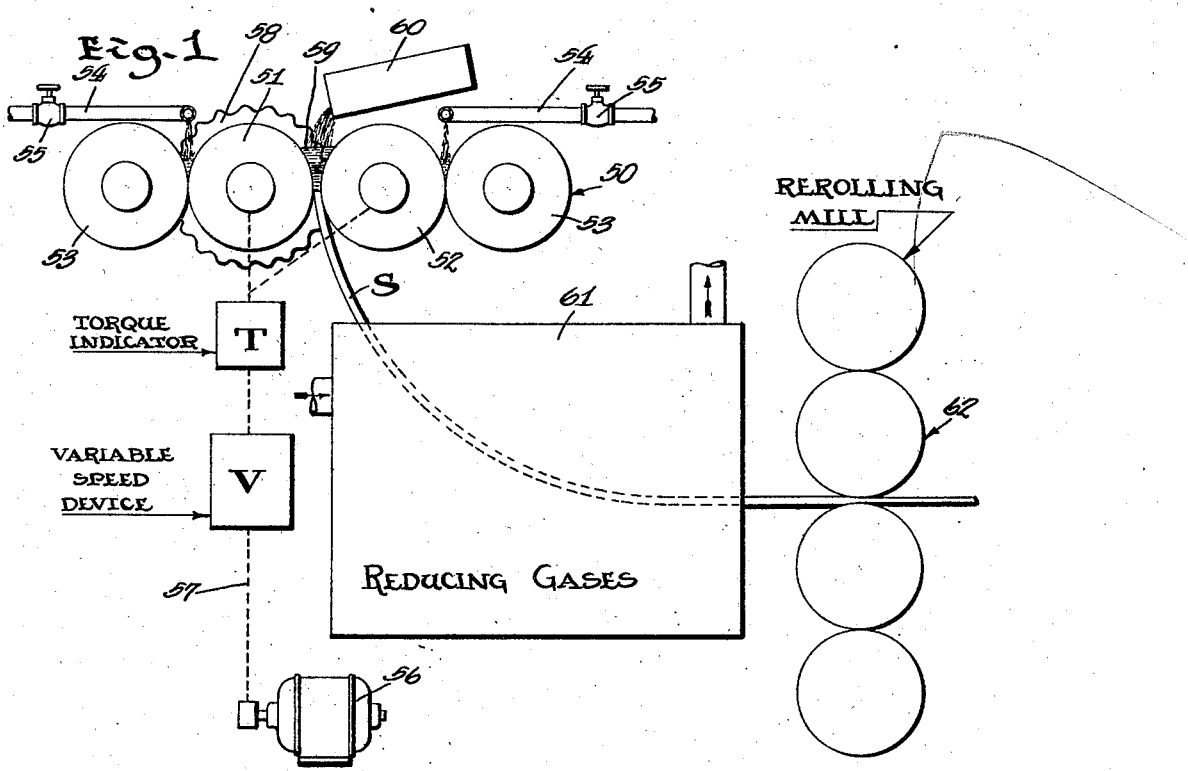
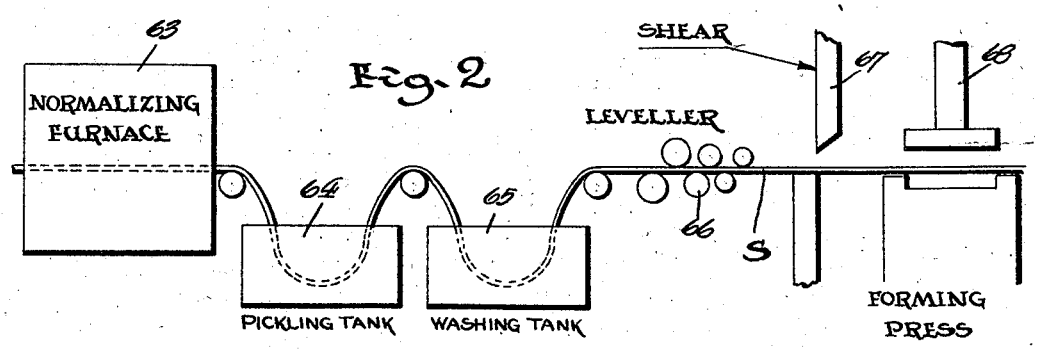
Clarence W. Hazelett
INVENTOR
By Freeman and Weidman
ATTORNEYS

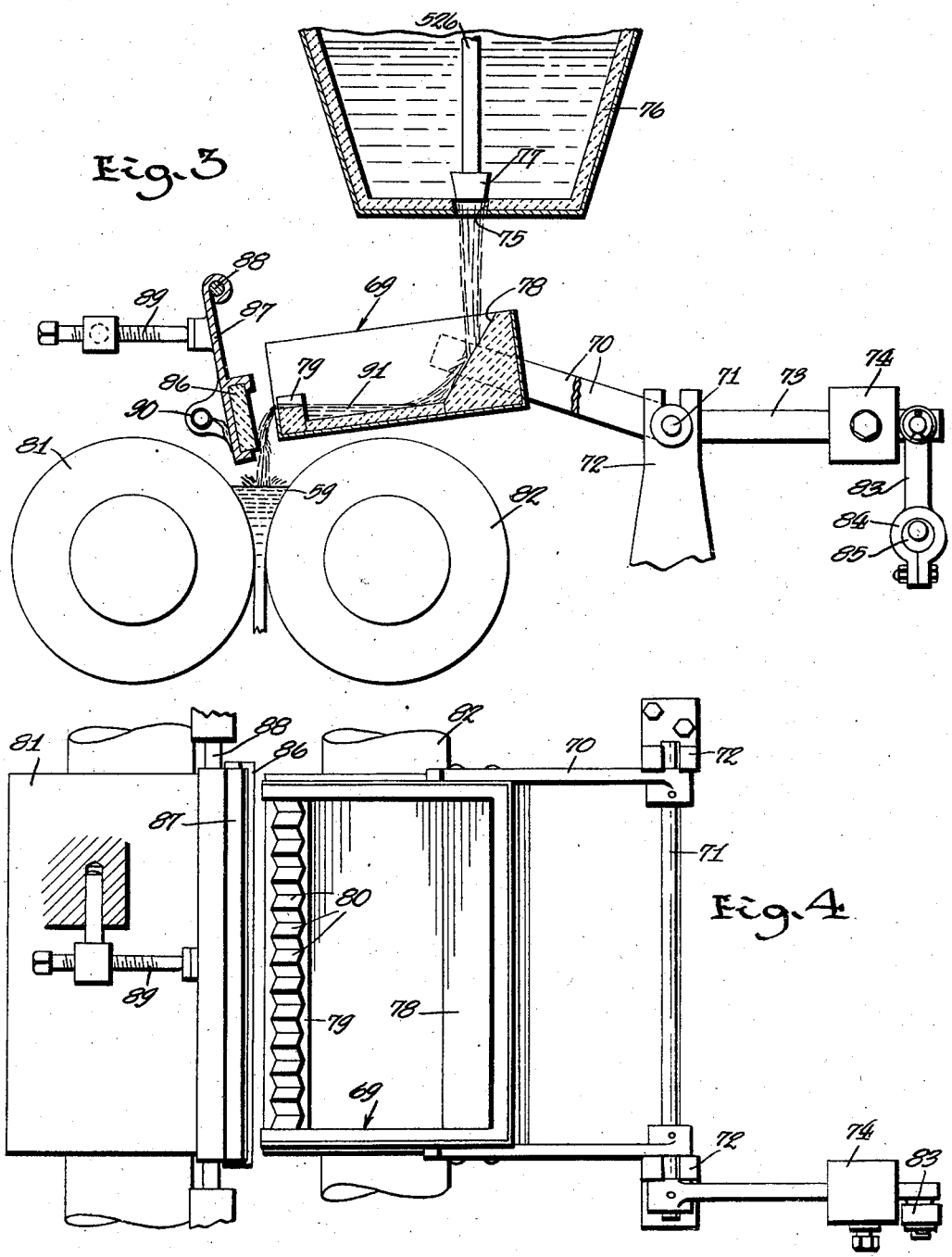

Oct. 27, 1936.　　C. W. HAZELETT　　2,058,447
METALWORKING PROCESS
Filed May 16, 1932　　16 Sheets-Sheet 3
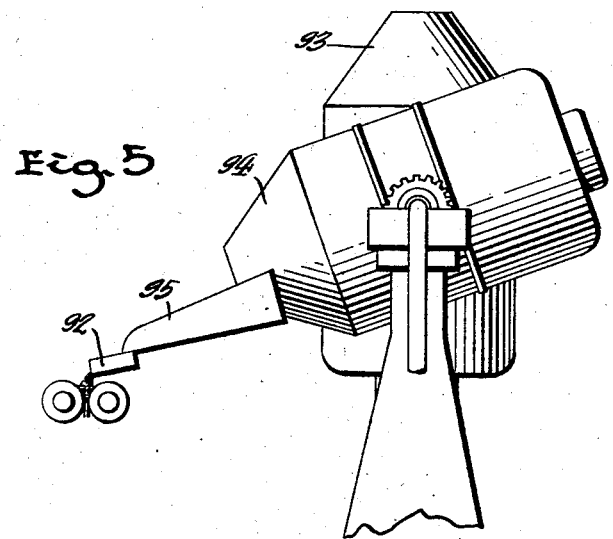
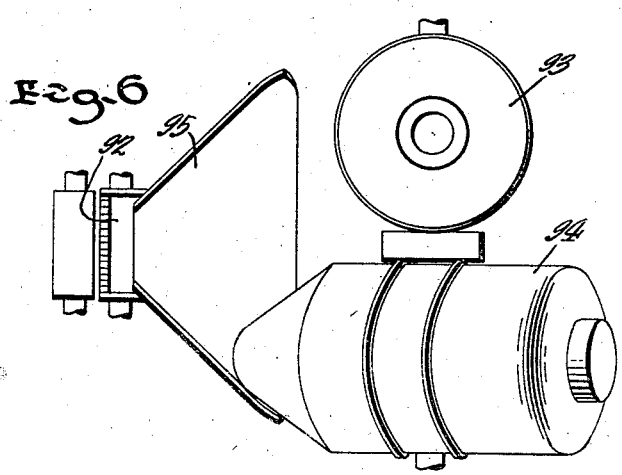
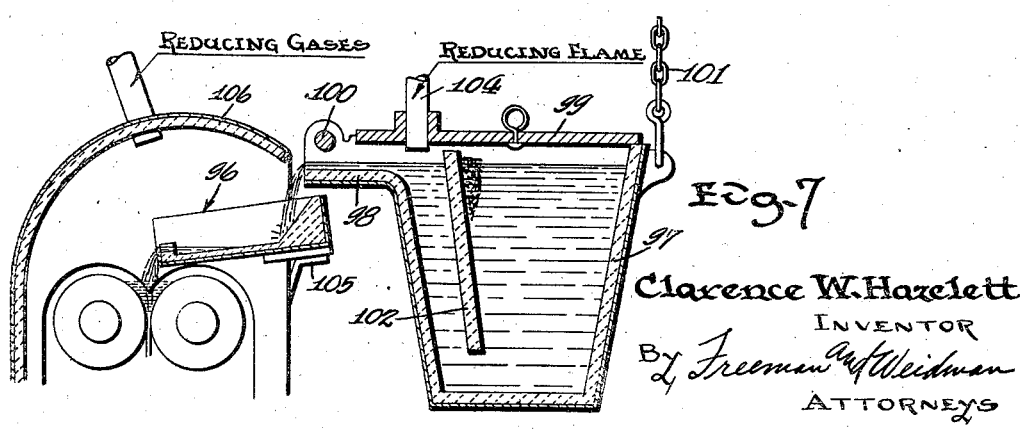

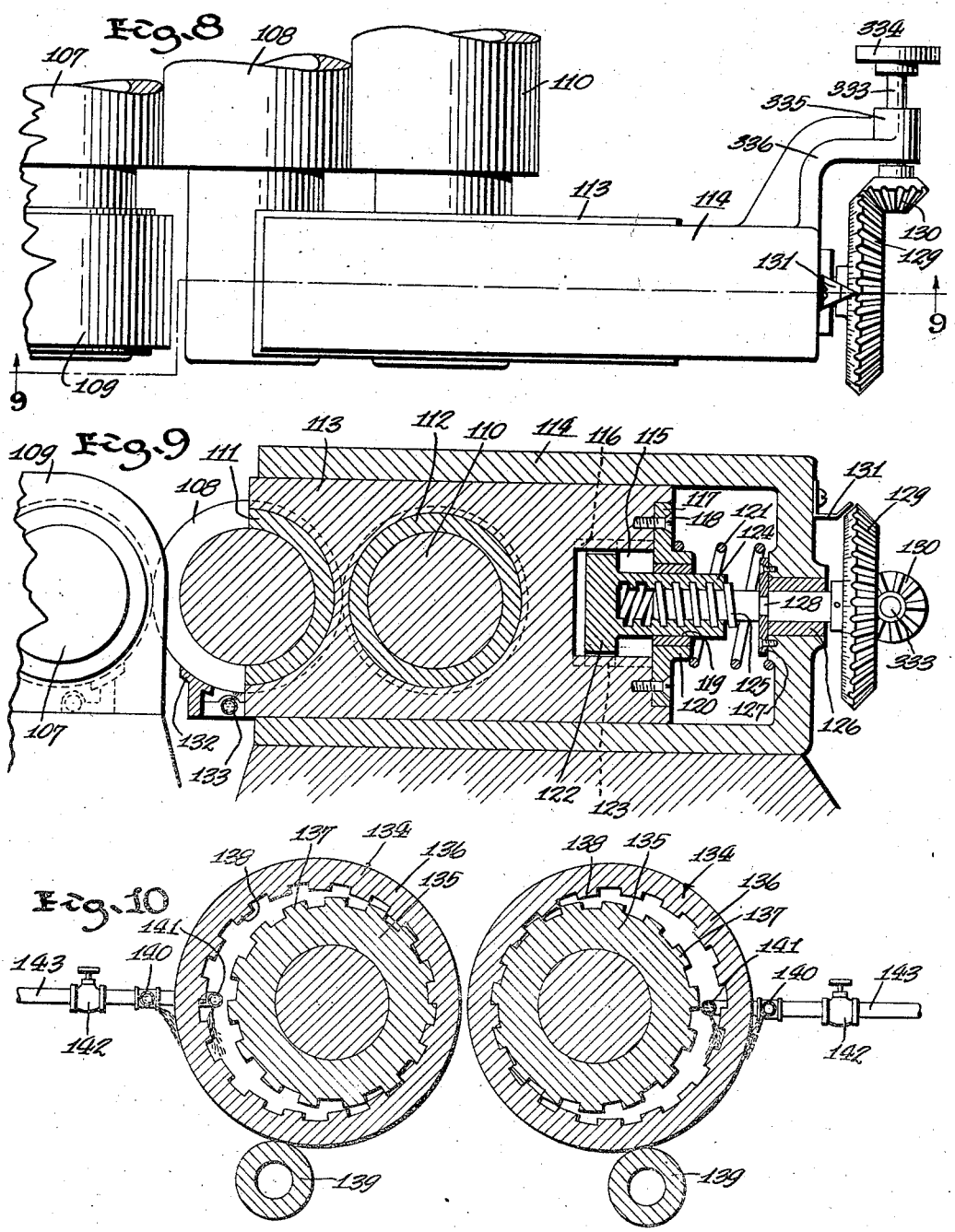

Oct. 27, 1936.  C. W. HAZELETT  2,058,447
METALWORKING PROCESS
Filed May 16, 1932  16 Sheets-Sheet 5
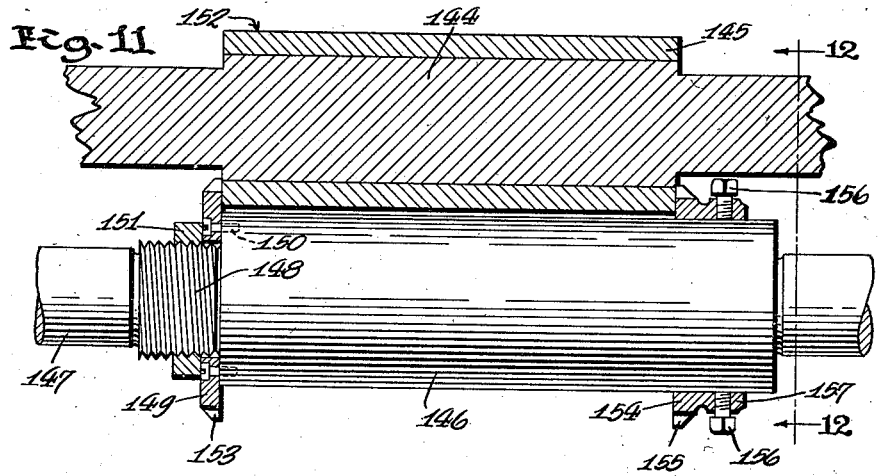
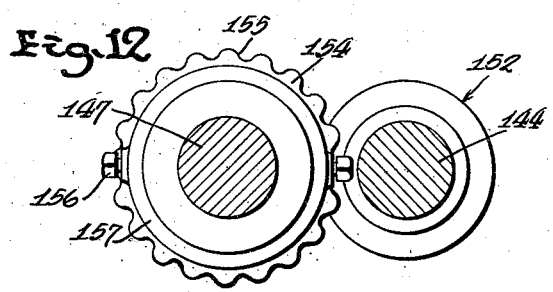
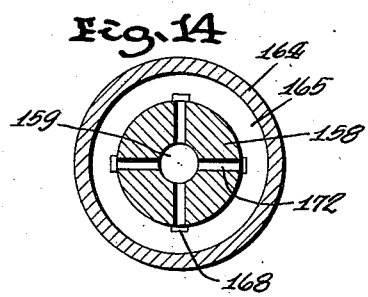
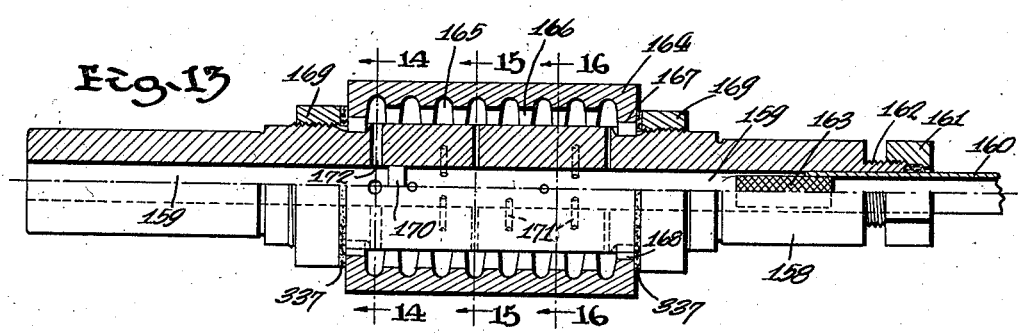
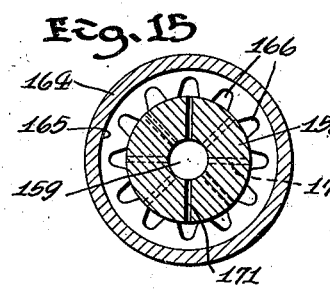
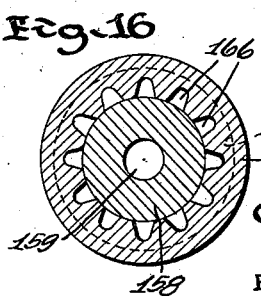
Clarence W. Hazelett
INVENTOR
ATTORNEYS Oct. 27, 1936.   C. W. HAZELETT   2,058,447
METALWORKING PROCESS
Filed May 16, 1932   16 Sheets-Sheet 6
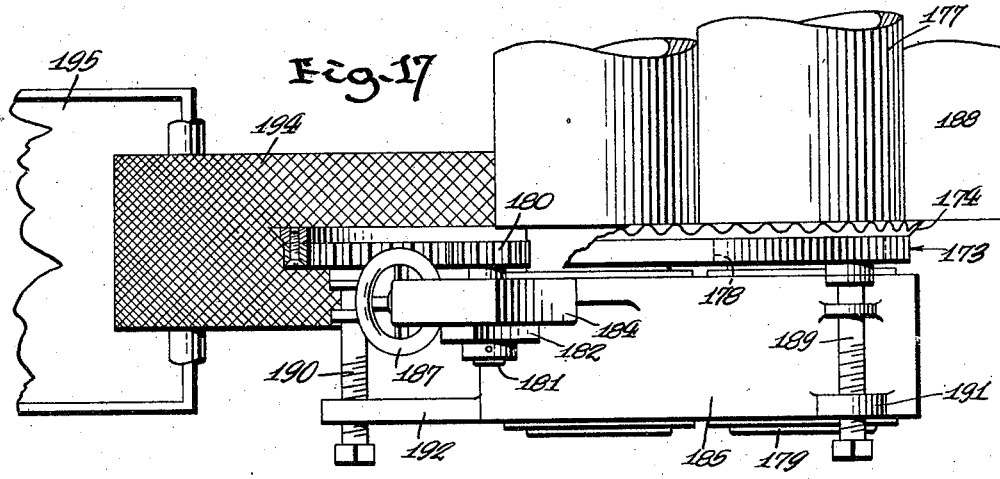
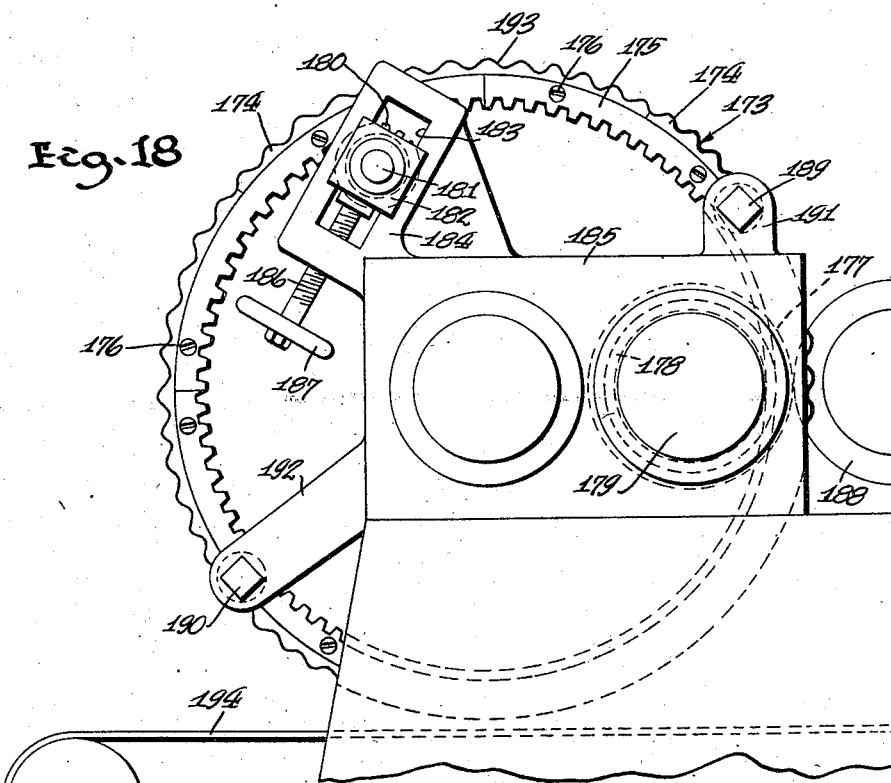
Clarence W. Hazelett
INVENTOR
By Freeman and Weidman
ATTORNEYS

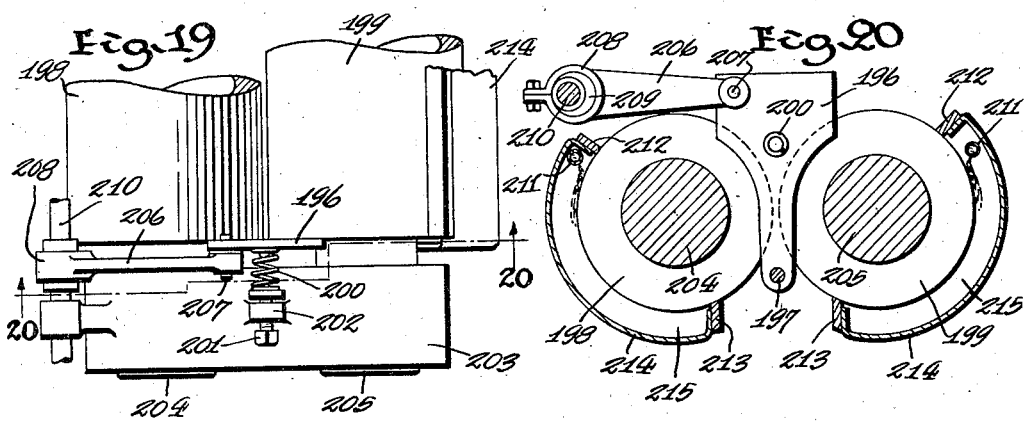
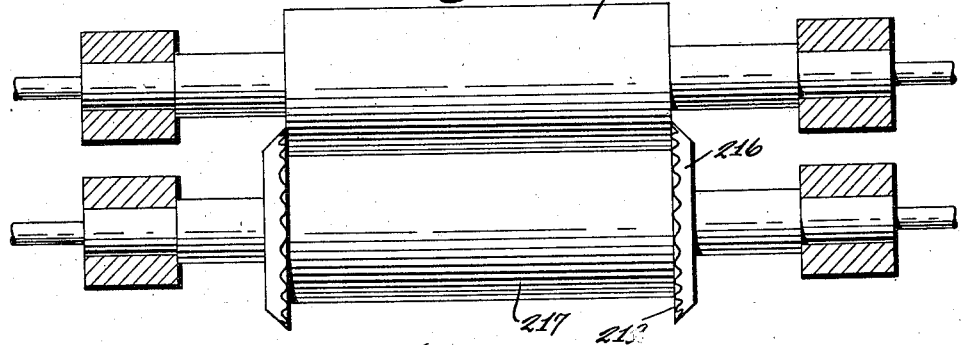
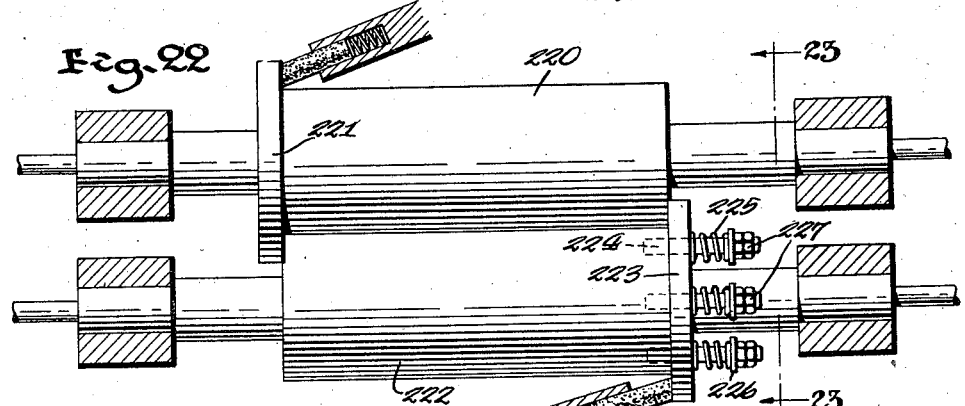
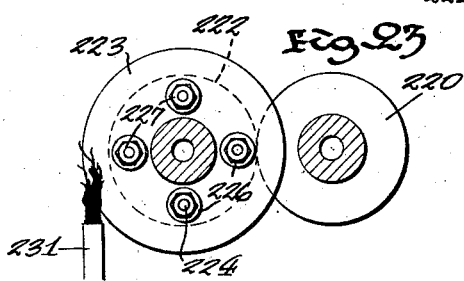

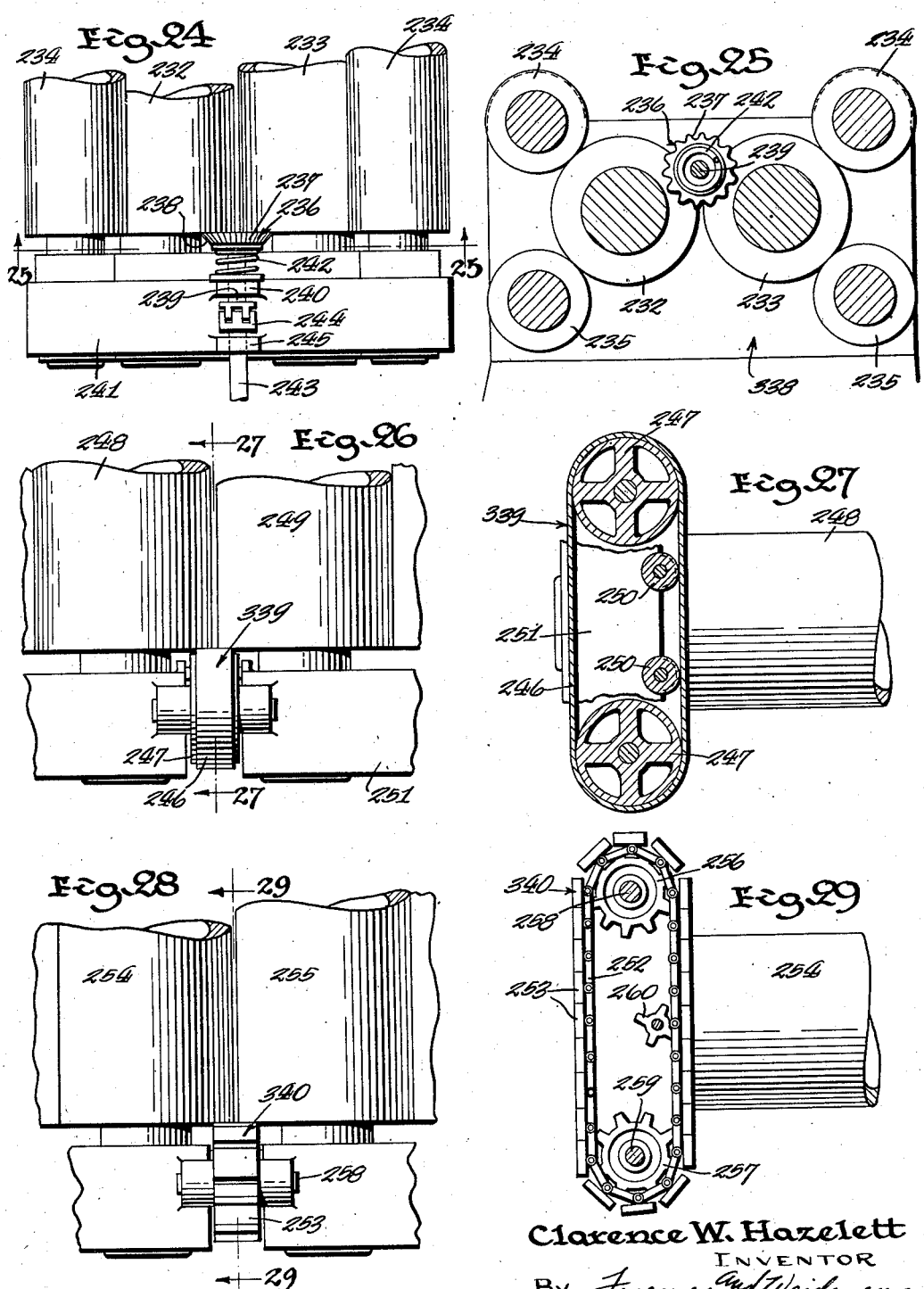

Oct. 27, 1936.  C. W. HAZELETT  2,058,447
METALWORKING PROCESS
Filed May 16, 1932    16 Sheets-Sheet 9
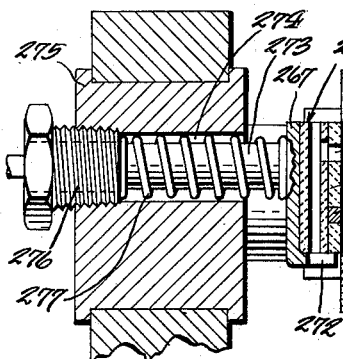
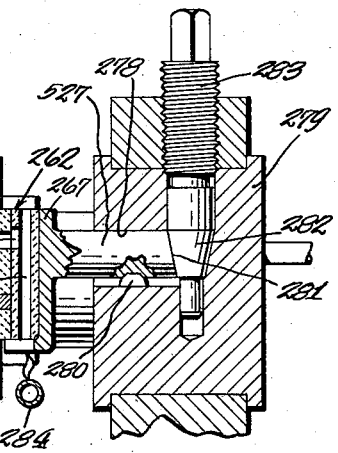
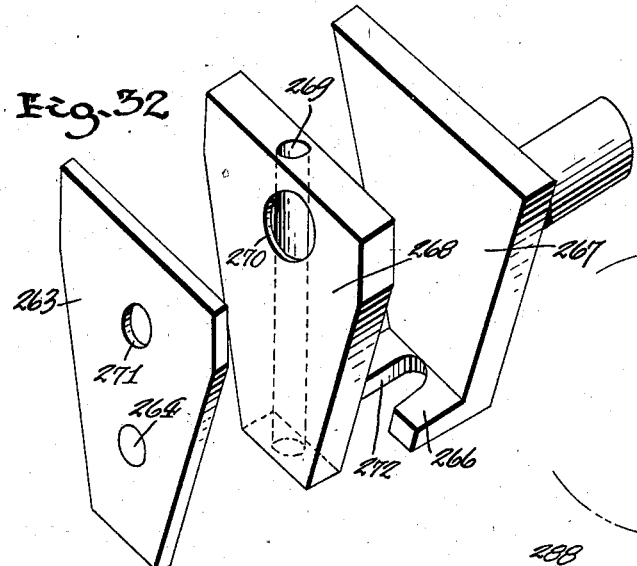
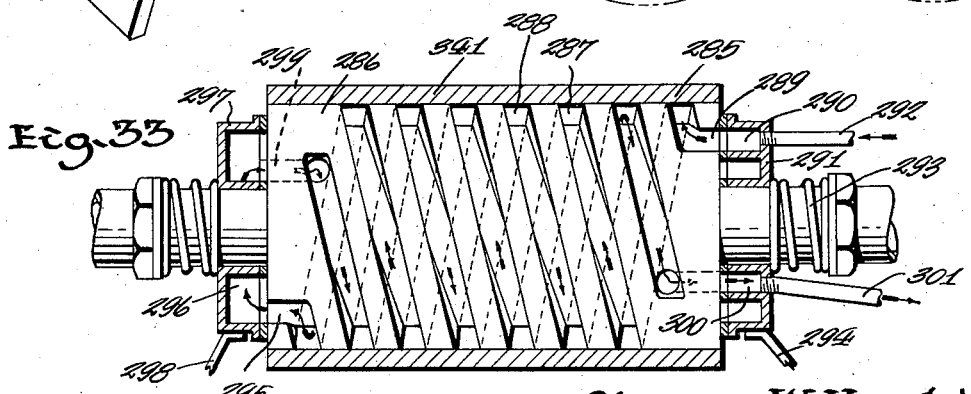
Clarence W. Hazelett
INVENTOR
By Freeman and Weidman
ATTORNEYS Oct. 27, 1936.  C. W. HAZELETT  2,058,447
METALWORKING PROCESS
Filed May 16, 1932  16 Sheets-Sheet 10
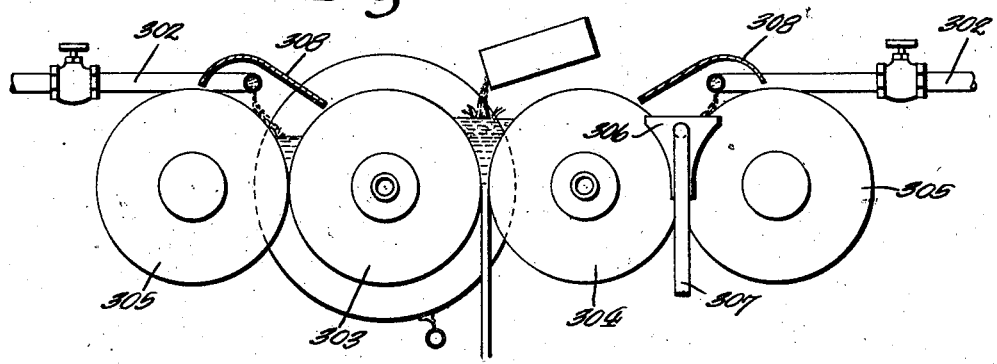
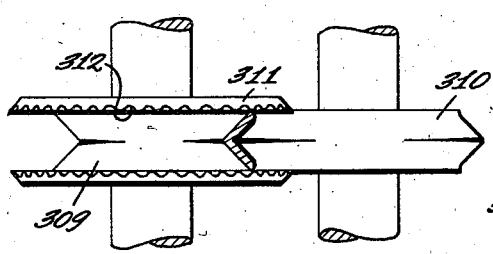
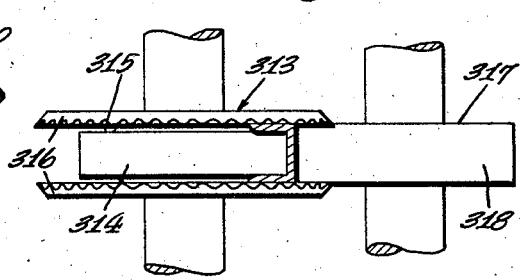
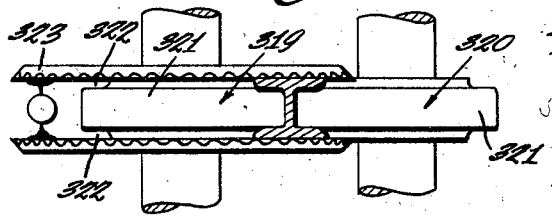
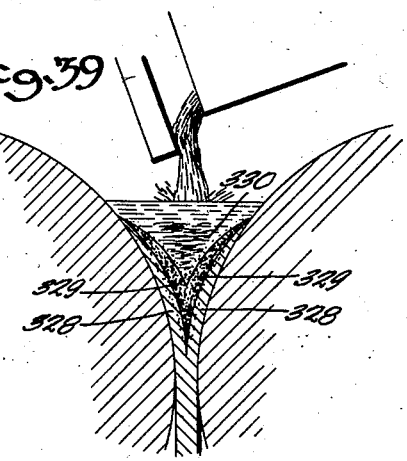
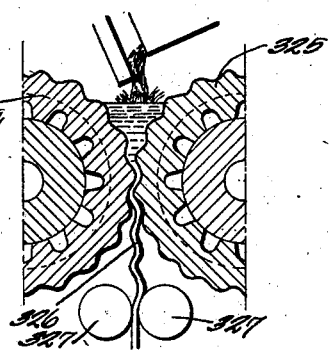
Clarence W. Hazelett
INVENTOR
By Freeman A. A. Weidman
ATTORNEYS Oct. 27, 1936.   C. W. HAZELETT   2,058,447
METALWORKING PROCESS
Filed May 16, 1932   16 Sheets-Sheet 11
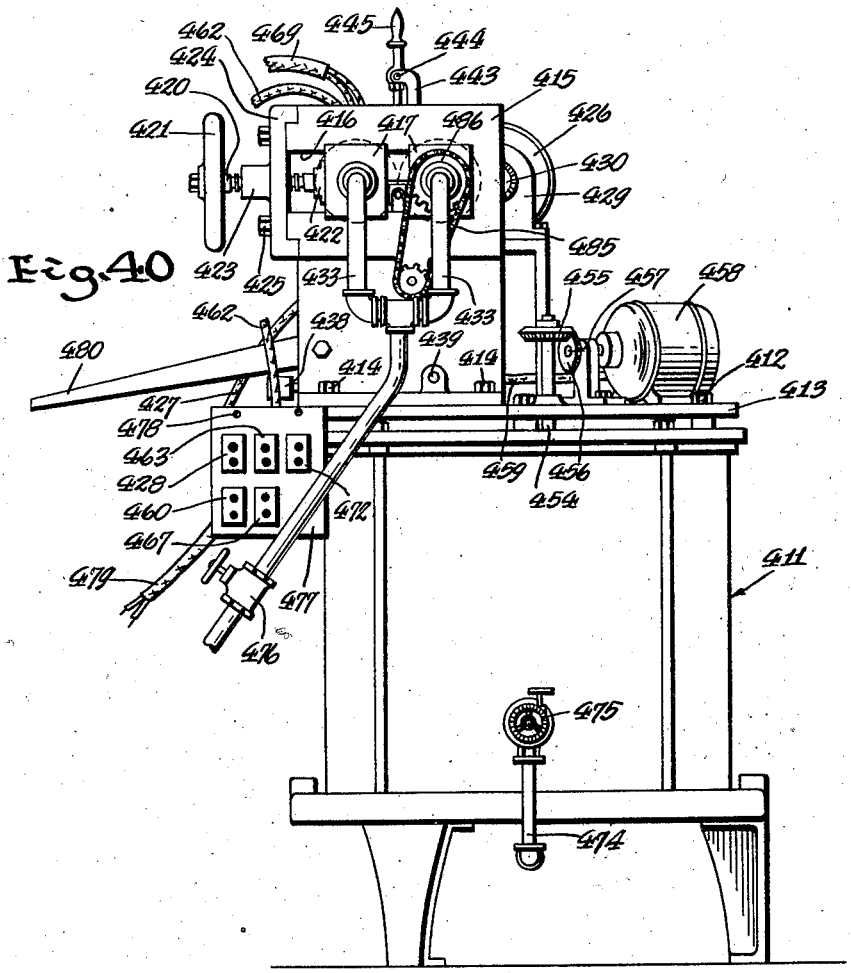
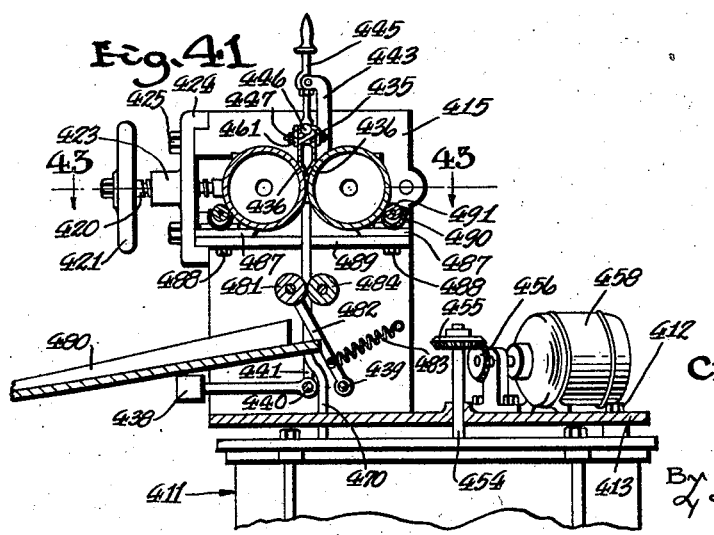
Clarence W. Hazelett
INVENTOR
By Freeman and Weidman
ATTORNEYS Oct. 27, 1936.　　　C. W. HAZELETT　　　2,058,447
METALWORKING PROCESS
Filed May 16, 1932　　　16 Sheets-Sheet 12
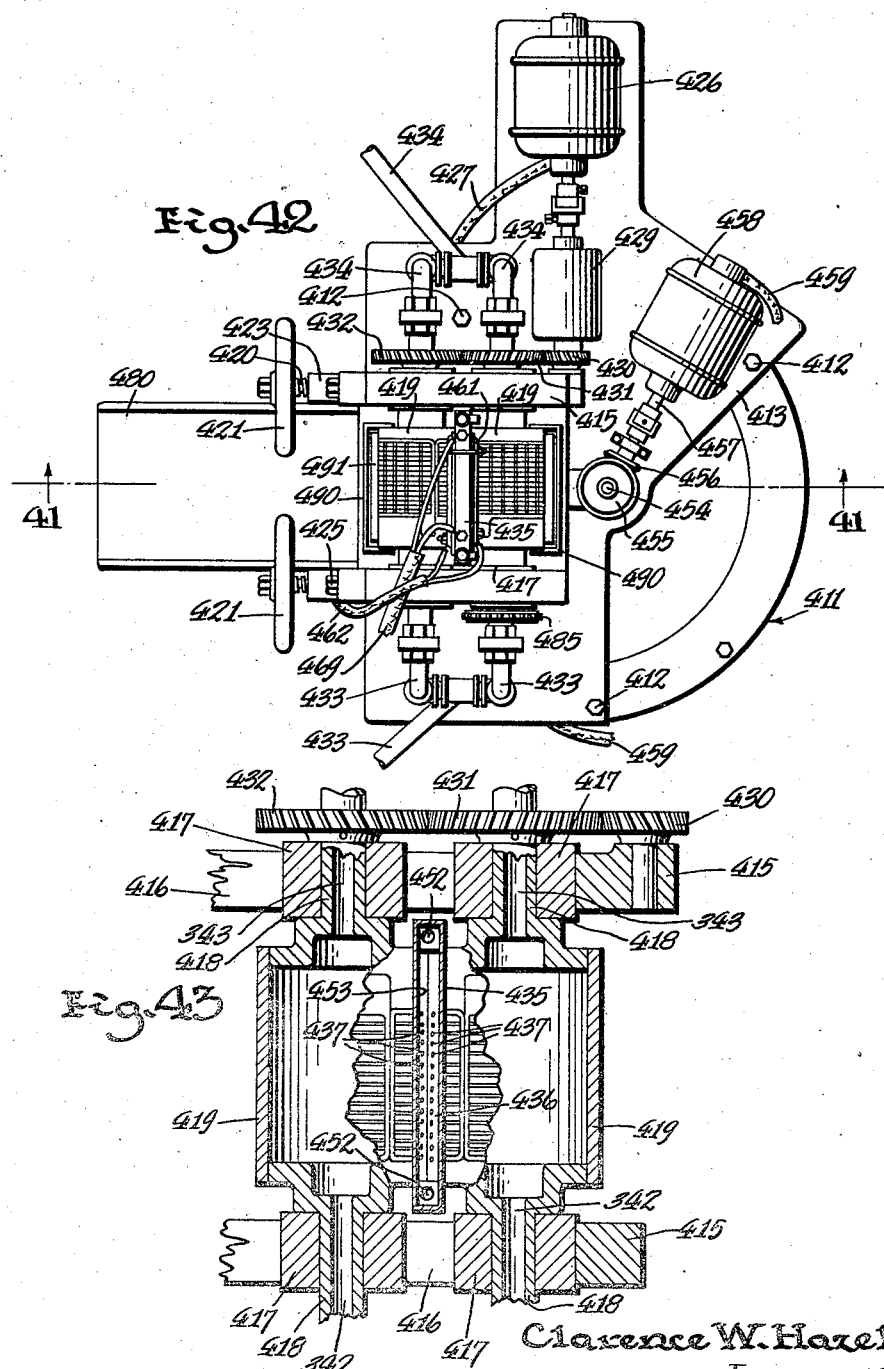

Oct. 27, 1936.  C. W. HAZELETT  2,058,447
METALWORKING PROCESS
Filed May 16, 1932   16 Sheets-Sheet 13
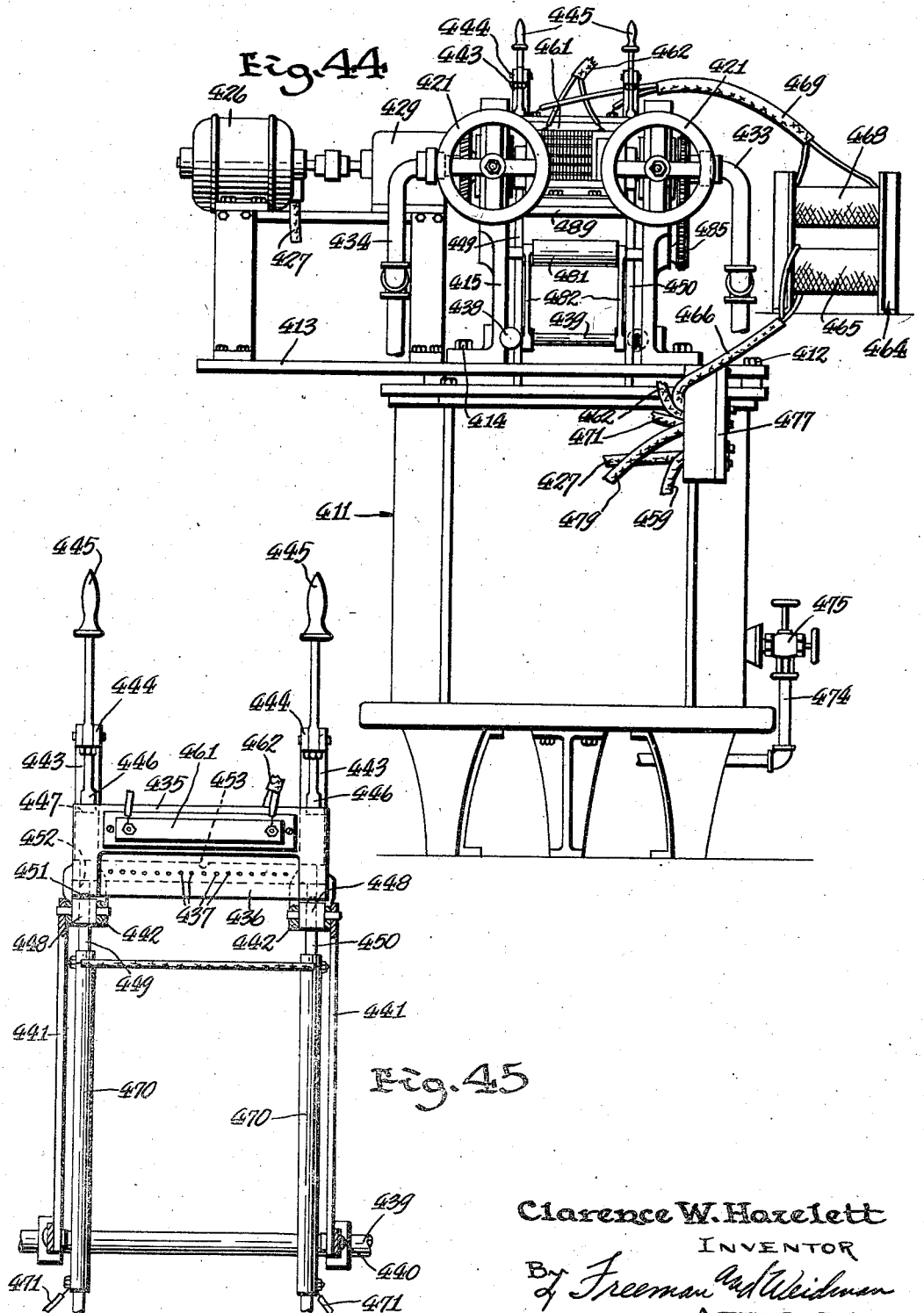

Oct. 27, 1936.  C. W. HAZELETT  2,058,447
METALWORKING PROCESS
Filed May 16, 1932  16 Sheets-Sheet 14

Clarence W. Hazelett
INVENTOR
By Freeman and Weidman
ATTORNEYS

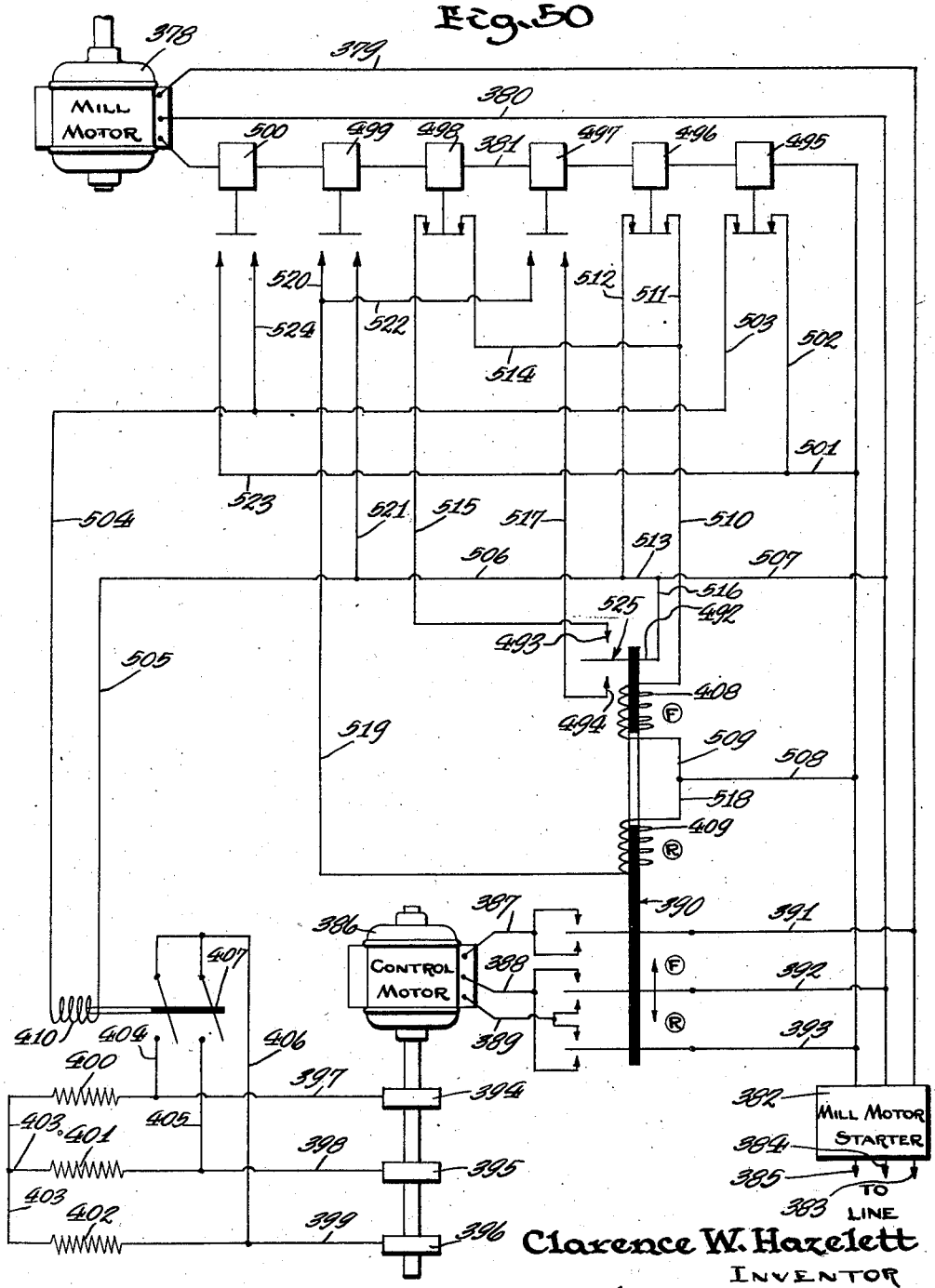

Oct. 27, 1936.   C. W. HAZELETT   2,058,447
METALWORKING PROCESS
Filed May 16, 1932   16 Sheets-Sheet 16
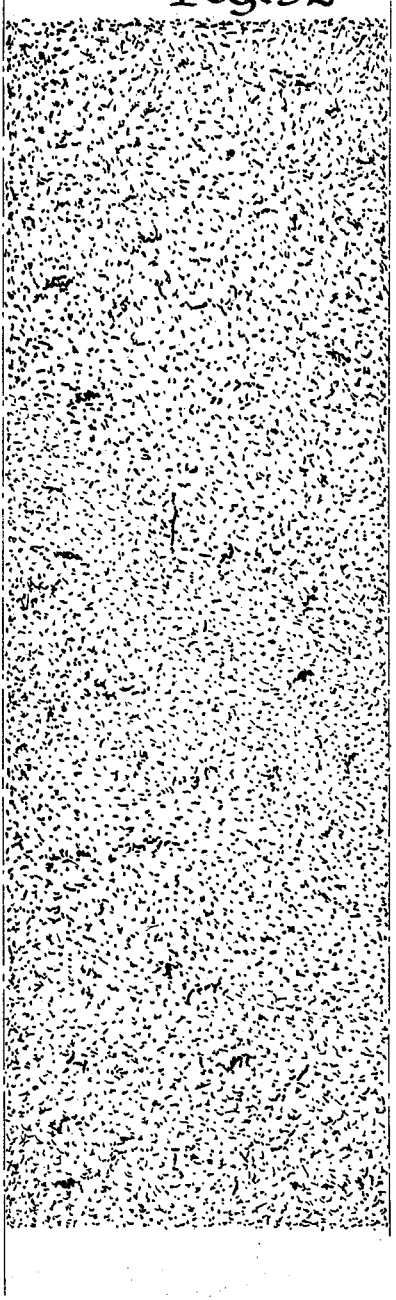
Clarence W. Hazelett
INVENTOR
By Freeman and Weidman
ATTORNEYS Patented Oct. 27, 1936

2,058,447

UNITED STATES PATENT OFFICE 2,058,447

METALWORKING PROCESS

Clarence W. Hazelett, Rocky River, Ohio

Application May 16, 1932, Serial No. 611,603

REISSUED

48 Claims. (Cl. 22—200.1)

This invention relates to metal products, and to methods of and apparatus for producing the same, and more particularly, to the forming of metal from a molten state, and to metal shapes and articles so formed, and has for an object the provision of new and improved methods, new and improved apparatus, and new and improved metal products, thereunto appertaining.

In the drawings accompanying this specification and forming a part of this application, I have shown, for purposes of illustration, several embodiments which my invention may assume, and in these drawings:

Figures 1 and 2 are together a diagrammatic side elevation of an embodiment of my invention, Figure 3 is a vertical longitudinal sectional view of a mechanism for feeding molten metal, Figure 4 is a plan view of the feeding mechanism illustrated in Figure 3, Figure 5 is a side elevation of another embodiment of metal feeding mechanism, Figure 6 is a plan view of the feeding mechanism illustrated in Figure 5, Figure 7 is a vertical sectional view of still another embodiment of metal feeding mechanism, Figure 8 is a fragmentary plan of a rolling mechanism, Figure 9 is a vertical sectional view taken on the line 9—9 of Figure 8, Figure 10 is a vertical sectional view of another embodiment of rolling mechanism, Figure 11 is a view partly in plan and partly in horizontal section of still another embodiment of rolling mechanism, Figure 12 is a transverse vertical sectional view taken on the line 12—12 of Figure 11, Figure 13 is a view partly in elevation and partly in longitudinal section of a further embodiment of rolling mechanism, Figure 14 is a transverse sectional view taken on the line 14—14 of Figure 13, Figure 15 is a transverse sectional view taken on the line 15—15 of Figure 13, Figure 16 is a transverse sectional view taken on the line 16—16 of Figure 13, Figure 17 is a fragmentary plan view of an end dam mechanism, Figure 18 is a side elevation of the end dam mechanism illustrated in Figure 17, Figure 19 is a fragmentary plan view illustrating another embodiment of end dam means, Figure 20 is a vertical sectional view taken on the line 20—20 of Figure 19, Figure 21 is a plan view of a different embodiment of roll and end dam mechanism, Figure 22 is a plan view of another embodiment of roll and end dam mechanism, Figure 23 is a vertical sectional view taken on the line 23—23 of Figure 22, Figure 24 is a fragmentary plan view of another embodiment of roll and end dam mechanism, Figure 25 is a vertical sectional view taken on the line 25—25 of Figure 24, Figure 26 is a fragmentary plan view of another embodiment of roll and end dam mechanism, Figure 27 is a vertical sectional view taken on the line 27—27 of Figure 26, Figure 28 is a fragmentary plan view of another embodiment of roll and end dam mechanism, Figure 29 is a vertical sectional view taken on the line 29—29 of Figure 28, Figure 30 is a view, partly in side elevation and partly in vertical longitudinal section, of another embodiment of roll and end dam mechanism, Figure 31 is an end elevation of the means illustrated in Figure 30, Figure 32 is a perspective view of parts of the end dam mechanism illustrated in Figures 30 and 31, Figure 33 is a fragmentary vertical section of a rolling and cooling means, Figure 34 is a side elevation of another embodiment of rolling and cooling mechanism, Figure 35 is a plan view of rolling mechanism particularly adapted for forming bars of angular cross-section, Figure 36 is a plan view of rolling mechanism particularly adapted for forming bars of channel cross-section, Figure 37 is a plan view of rolling mechanism particularly adapted for forming bars of I cross-section, Figure 38 is a vertical sectional view through rolling mechanism having corrugated surfaces, Figure 39 is a fragmentary vertical sectional view of rolling mechanism, illustrating several stages of solidification of metal with respect thereto, Figure 40 is a front elevation of an embodiment wherein the metal is supplied by a gate, Figure 41 is a section parallel to the plane of Figure 40, on the line 41—41 of Figure 42, Figure 42 is a top plan view of the embodiment of Figure 40, Figure 43 is a horizontal section, on the line 43—43 of Figure 41, Figure 44 is a side elevation of the embodiment of Figure 40, Figure 45 is a detail of the gate biasing and connecting means.

Figure 50 is a diagrammatic representation of alternative automatic control means.

Figure 51 is a reproduction of a micro-photograph of a strip of steel rolled according to my process, while Figure 52 is a reproduction of a micro-photograph of the strip, after rerolling.

Figure 46:
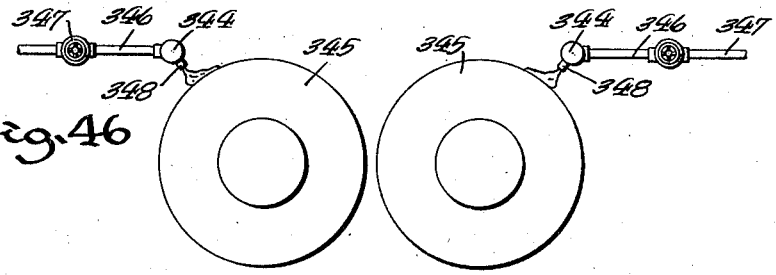
Figure 46 is a detail view showing means for heating the rolls.

In Figures 1 and 2 I have shown a horizontal mill 50 comprising a pair of horizontal rolls 51 and 52 mounted in juxtaposed parallel relation and backed by a pair of backing rolls 53. The rolls 51 and 52 are cooled, as by water delivered to the spaces between the rolls 51 and 52 and the respective backing rolls 53, as by ducts 54 controlled by valves 55, and are shown as driven by a motor 56 connected to the rolls 51 and 52 by a connection indicated diagrammatically at 57. Variable speed of rotation of the rolls 51 and 52, if desired, may be secured in any suitable manner, as by using for the motor 56 a variable speed motor, or by inserting in the drive 57 a variable speed device V of any suitable construction.

Mounted on the roll 51 are a pair of end dams 58 cooperating with the rolls 51 and 52 to define between the rolls 51 and 52, above the points of tangency thereof, a space 59 for the reception of molten metal.

Mounted above the mill 50 is a reservoir 60 adapted to receive molten metal from any suitable source (not shown), and to deliver this molten metal to the space 59 between the rolls 51 and 52. The rolls 51 and 52 being below the temperature of fusion of the metal, the metal solidifies contiguous the rolls 51 and 52, and the metal so solidified contiguous the rolls 51 and 52 is carried down to the bight of the rolls, and issues as the continuous strip S.

With apparatus of this type the characteristics of the strip S depend at least in large part on the relation between the extent of the solidification contiguous the rolls 51 and 52 and the spacing between the rolls 51 and 52. With the solidification entirely insufficient the molten core will fuse through the solidified faces, and the metal will pour through as a molten stream. With somewhat greater solidification the relatively thicker solidified surfaces will be sufficiently thick to prevent fusion through by the relatively thinner molten core, and the molten core will solidify between the solidified surfaces, uniting the solidified surfaces to itself, and the strip S will be distinctly a cast strip. This characteristic seems to continue up to the point where the extent of solidification is substantially equal to the spacing between the rolls, but beyond that point there occurs this marked difference, that thereafter, by reason of the fact that the solidified metal delivered at the bight of the rolls is of greater thickness than the spacing of the rolls, the strip is definitely a rolled strip.

I find, however, that the extent of solidification, and therefore, for any given spacing of the rolls 51 and 52, the extent of solidification relative to the spacing of the rolls, is a result of various factors, including the nature of the metal itself, the temperature of the metal as delivered to the rolls, the length of the arc of contact of the metal with the rolls, the temperature of the rolls, and the speed of rotation of the rolls, and concurrently, that for any given metal, I can maintain any desired extent of solidification, and therefore, with any given spacing of the rolls, any desired extent of solidification relative to the spacing of the rolls, by maintaining constant the relation between the various factors. And that I can maintain this relation constant by controlling any one or more of the factors, to compensate for variation in one or more other factors.

For example, with any given metal, I may maintain constant extent of solidification, and with a given spacing of the rolls, constant extent of solidification relative to the spacing of the rolls, despite variation in other factors, by coordinate variation in the speed of rotation of the rolls, as by variation in the speed of the motor 56 itself, or by means of the variable speed device V. Or I may accomplish the result by coordinately varying the arc of contact of the metal with the rolls, as by varying the flow of metal to the space 59 between the rolls, or by varying the effective height of the end dams, to vary the vertical extent of the space 59. Or I may accomplish the result by coordinately varying the temperature of the metal, as by actual variation of the temperature of the metal as supplied, or by heating the metal in the space 59 in any suitable manner, such as by the passage of electric current therethrough, or, in the case of magnetic metal, by inducing currents therein. Or I may accomplish the result by coordinately varying the temperature of the rolls, as by coordinately varying the cooling thereof, as, for example, by varying the valves 55 to vary the amount of cooling fluid supplied by the ducts 54, or by varying the temperature of the cooling fluid itself, as by intermixing steam and water in varying proportion. Or if the temperature of the cooling fluid is itself variable, I may maintain constant cooling of the rolls by coordinately varying the quantity of cooling fluid supplied to the rolls. And of course I may accomplish the maintenance of constant extent of solidification, and of constant extent of solidification relative to the spacing of the rolls, by any combination of coordinate variations of the factors.

Considering the factors mentioned, the extent of solidification is increased by decrease in the speed of rotation of the rolls, by decrease in the temperature of the metal, by decrease in the roll temperature, and so far as I am now aware, by increase in the arc of contact of the metal with the rolls.

But however the control may be accomplished, coordination of the factors governing the extent of solidification is of extreme importance, since variation, even if small, will materially affect the quality and characteristics of the product, and of course, if larger, may result in appreciable damage and destruction, either by the passage of metal through the rolls without solidification, or, in the other direction, by over-solidification to an extent sufficient to wreck the mill. Whereas by suitable coordination it is possible to obtain and continuously to maintain any desired condition, as, for example, solidification of the metal in a thickness somewhat greater than the spacing of the rolls, whereby the metal is rolled by the rolls, and the strip S is a rolled strip.

In Figures 1 and 2 I have shown subsequent processing which may be in part or in whole applicable to a strip S of any characteristics, but which is presented as particularly applicable to a rolled strip.

This comprises first a reducing chamber 61 mounted adjacent the mill 50 for the passage of the strip S therethrough, and containing reducing gases operative both to reduce any oxide existent on the surface of the strip and also, to prevent or diminish such formation of oxide subsequently.

Adjacent the chamber 61 is mounted a re-rolling mill 62, for re-rolling the strip, either to vary its characteristics or to vary its size, or both, as may be desired.

Beyond the re-rolling mill 62 the strip S passes successively: through a normalizing furnace 63, for heat treating the strip; through a pickling tank 64, containing acid or other suitable solution for removing any oxide present on the surface of the strip; through a washing tank 65, for washing the strip S after the emergence thereof from the pickling tank 64; and through a leveler 66, for leveling out any irregularities in the strip. The strip S is shown as then passing to a shear 67, to be cut into lengths, and then as passing in this form to a forming press 68, to be formed and shaped as desired. It will be understood, however, that these operations to some extent may be performed in an order other than that illustrated, and also, that any or all of these operations may be omitted, all as may be desired. It is to be noted, however, that such of these operations as are included may operate on the strip while the strip retains its original heat, and without any reheating.

In this connection it may be added, that the passage of the strip immediately through the reducing chamber 61 and the re-rolling mill 62, so that the strip reaches the re-rolling mill 62 before any oxide has formed in any surface cracks present in the strip S, is most effective to completely obliterate any trace of any such cracks, as though such cracks had never existed.

From the foregoing, it will be apparent that by use of the apparatus described, metal from a molten state may be formed into a solid continuous strip, and treated and fabricated into a finished article, by a succession of instrumentalities operating continuously, while the metal still is hot and connected with the parent body of molten metal in the space 59 between the rolls 51 and 52.

In Figures 3 and 4 I have shown a detailed embodiment of means for supplying the molten metal to the rolls, corresponding to the reservoir 60 heretofore referred to, and comprising a reservoir 69, lined with fire brick to resist the action of the molten metal, and mounted between the forward ends of a pair of arms 70, the rear ends of which are fixed to a shaft 71 journaled in a support 72. A rearwardly extending arm 73 is also fixed to the shaft 71 at one end thereof, and is provided with an adjustable counterweight 74 for counterbalancing the weight of the reservoir 69 and of the metal contained therein. Molten metal is supplied to the reservoir 69 through a submerged outlet 75 provided in the bottom of a ladle 76, and the flow of metal through this opening may be controlled by means of a vertically reciprocable valve member 77 carried at the lower end of a rod 526 operated in any suitable manner. The rear wall of the reservoir 69 may be inclined, as indicated at 78, to prevent the metal delivered to the reservoir 69 from contacting too forcibly therewith, and for distributing the metal transversely of the reservoir 69 and deflecting it in a forward direction. The forward end of the reservoir 69 is provided with a dam 79 having a serrated upper edge forming a series of notches 80 through which the metal overflows to the space 59 between the rolls 81 and 82. By means of this particular construction, the metal supplied to the reservoir 69 from the ladle 76 is allowed to form a pool 91 at the rear of the dam 79, where it may become quiescent if in an effervescent state, and where it becomes distributed in a lateral direction.

This dam 79 may, however, be formed with a straight overflow edge if desired, and the molten metal may be caused to flow over the dam in a succession of waves or surges. To this end the reservoir 69 is constructed to be periodically tilted by means of a link 83 pivotally connected at its upper end to the end of the arm 73 and provided at its lower end with an eccentric strap 84 engaging a constantly rotating eccentric 85. The successive tilting of the reservoir 69 by the eccentric 85 causes the molten metal to flow over the dam 79 in a relatively broad stream of substantially uniform depth.

A baffle 86 is positioned directly in front of the reservoir 69, and is adapted to intercept the metal flowing over the dam 79 and direct it downwardly centrally between the rolls 81 and 82. The baffle 86 is carried by a bracket 87 which is pivotally mounted at its upper end, as indicated at 88, and which may be adjusted toward and away from the reservoir 69 by means of an adjusting screw 89. The baffle 86 may be heated by a flame issuing from a burner 90, in order to prevent both cracking of the baffle by the metal or premature chilling of the metal by the baffle.

After passing through the dam 79, the molten metal impinges upon the baffle 86, which reduces its velocity, and further, tends to spread the metal, so that it surely will be distributed uniformly throughout the length of the rolls 81 and 82. The baffle 86 also functions to deflect the metal downwardly into the pool at a point of greatest depth, so that it will not have a tendency to melt the metal which has become solidified along the surface of these rolls, an action which would tend to cause the metal to pass through the rolls before it has become solidified to the desired extent.

In Figures 5 and 6 I have shown molten metal being supplied to a reservoir 92 from a pair of Bessemer converters, indicated diagrammatically at 93 and 94. These converters may be operated alternately, to obtain a substantially continuous supply of metal to the rolls. The molten metal from the converters 93 and 94 is delivered to a chute 95 having converging side walls, which in turn supplies the metal to the reservoir 92. If the metal delivered from the converters be in an effervescent state, it will give up at least a considerable part of its gases while traversing the chute 95 and the reservoir 92.

In Figure 7 there is shown an arrangement in which molten metal is delivered to a reservoir 96 directly from a top-pour ladle 97, having a pouring spout 98 and a removable cover 99. This ladle is pivotally mounted adjacent its forward end, as indicated at 100, and may be tilted by means of a chain 101 secured to the rear end thereof. A baffle 102 is disposed within the ladle 97 in spaced relation with the bottom thereof, so that the molten metal passing to the spout 98 will flow downwardly beneath the baffle, thus excluding any dross from the metal delivered to the reservoir 96. A burner 104 is provided in the cover 99, to project a flame in the vicinity of the metal flowing through the spout 98, in order to minimize oxidation and reduce effervescence. In this particular embodiment the reservoir is fixedly mounted upon a bracket 105, and is enclosed within a housing 106 supplied with reducing gas provided to prevent oxidation of the metal being delivered to the rolls.

In Figures 8 and 9 I disclose rolling mechanism including rolls 107 and 108 corresponding to the rolls 51 and 52. When the apparatus is initially set in operation, it is desirable that the forming rolls 107 and 108 occupy a position in which their surfaces are in engagement, so that the molten metal will not run downwardly therebetween before it has had time to become sufficiently solidified to emerge as a strip. To this end means are provided for yieldably urging the forming roll 108 toward the roll 107. In this particular construction, the roll 107 is journaled in a fixed bearing 109, but the roll 108, and its associated back-up roll 110, are mounted in bearings 111 and 112 provided in a carriage 113 mounted for horizontal adjustment in a slide 114. The bearing 111 of the roll 107 may be a half-bearing, as shown, so as to permit the roll 108 to be quickly and easily removed or assembled in position.

The inner end of the carriage 113 is provided with a recess 115 formed with longitudinally extending slots 116 and with a plate 117 secured thereto by means of screws 118 and provided with a centrally disposed opening 119 surrounded by an annular flange or collar 120. A spring 121 is interposed between the end of the slide 114 and the plate 117, and urges the carriage 113, together with the forming roll 108 and the associated back-up roll 110, toward the fixed roll 107. Disposed within the recess 115 is an adjustable stop 122 provided with diametrically disposed key portions 123 for sliding engagement with the slots 116 and also with an internally screw threaded tubular member 124 which extends rearwardly through the opening 119 in the plate 117 for engagement by a screw 125 rotatably mounted in a bearing 126 provided in the end of the slide 114 and maintained against displacement by means of a pair of arcuate collar members 127 secured to the inner face of the slide 114 for engagement with an annular groove 128 provided in the screw 125. The other end of the screw 125 is provided with a bevelled gear 129 which is adapted to be rotated by means of a bevelled pinion 130 fixed to one end of a shaft 333 provided with an operating handle 334 and journaled in a bearing 335 carried by a bracket 336 fixed to the side of the slide 114. A pointer 131 is secured to the end of the slide 114 for cooperation with a series of calibrations provided on the periphery of the bevelled gear 129.

When the apparatus is not in operation, and there is no metal between the rolls 107 and 108, the spring 121 urges the roll 108 into engagement with the roll 107. As soon, however, as metal is introduced into the space between the converging upper portions of the rolls 107 and 108, and becomes solidified through contact therewith, the rotation of the rolls 107 and 108 carries the solidified metal downwardly between the rolls, thus causing the roll 108 to recede against the action of the spring 121 until the carriage 113 abuts the adjustable stop 122, which determines the amount of separation between the rolls 107 and 108, and the thickness of the bar or strip of metal rolled thereby. This distance may be regulated, to roll metal of the thickness desired, by accurately adjusting the position of the stop 122, by means of the operating handle 334 connected to the pinion 130, and to the position indicated by the pointer 131.

The rolls 107 and 108 may be provided with scrapers 132, for preventing the metal from sticking thereto, and for removing scale therefrom, and may be cooled by water sprayed thereon from pipes 133.

In Figure 10 there is shown another type of construction comprising forming rolls 134 each having an inner core 135 within an outer shell 136 of an internal diameter considerably in excess of the outside diameter of the core 135. The core 135 and shell 136 engage at the bight of the rolls 134, and are provided with external and internal teeth 137 and 138, respectively, which intermesh at that point.

The shells 136 are supported by rolls 139 and are cooled both externally and internally by a cooling medium such as water or live steam, or a combination thereof, issuing from nozzles 140 and 141 located respectively outside the shell 136 and between the core 135 and shell 136, at a point diametrically opposite the point of tangency between the core 135 and the shell 136. The flow of cooling fluid to the nozzles 140 and 141 may be controlled by valves 142 provided in supply pipes 143, thus to vary the temperature of the rolls 134, to controllably affect solidification of the metal, as hereinbefore pointed out. By means of this construction the rolls 134 present substantially solid and unyielding surfaces to the metal being rolled, yet at the same time permit the shell to be cooled both internally and externally. It will be noted also that the shell, the part in actual contact with the metal, is relatively thin, as compared to the remainder of the roll, and consequently dissipates heat very quickly when subjected to the action of the cooling medium issuing from the nozzles 140 and 141, but presents what is in effect a continuous and solid roll at the point of action, where it is subjected to strain. Also, in this construction the outer shells are relatively inexpensive, and may be quickly and easily removed for replacement or repairs, without disrupting the associated mechanism.

In Figures 11 and 12 there is shown a roll 152 comprising a solid steel core 144 having an outer shell 145 of cast iron. This provides a very inexpensive and efficient construction, in that the roll is provided with a rough relatively tractive surface which may be chiseled off when worn and replaced by a new shell. In this construction the roll 146 is provided with a driving shaft 147 provided with a threaded portion 148, and an annular end dam 149 is secured to the end of the roll 146 by means of screws 150, and is reinforced by means of a back-up nut 151 threaded onto the portion 148 of the shaft 147. The outer periphery of the end dam 149 overlaps the ends of the adjacent cooperating roll 152, to provide a space between the rolls 146 and 152 adapted to receive the molten metal, and is provided with a plurality of peripheral teeth 153 formed with rounded extremities, but coming substantially to a knife edge. The teeth 153 cooperate with the end of the roll 152 to shear off any metal which may overflow over the top of the end dam, thus to prevent progressive freezing of metal from the end dam outwardly into the space between the rolls, and the interference with operation of the mill which would result therefrom. An end dam 154, provided with teeth 155, is provided on the other end of the roll 146, for cooperation with the corresponding end of the roll 152, and is adjustably secured in position by means of set-screws 156 threaded into an annular hub portion 157 of the end dam. This permits formation of sheets of different widths by change of only one roll. For example, if it is desired to fabricate a sheet of metal of less width than that provided for by the length of the roll 152, this roll is removed, and a roll of decreased length substituted, and the set-screws 156 are loosened, and the end dam 154 is moved inwardly along the roll 146 until it engages the end of the shorter roll, and then is secured in position, by tightening the set-screws 156.

In Figures 13 through 16, there is shown another type of forming roll particularly adapted to be cooled by steam or water circulated through the interior thereof. In this construction, a shaft 158 is formed with a longitudinally extending passage 159 which communicates at one end with a supply pipe 160 held in position by means of a suitable packing gland 161 threaded onto a reduced threaded extremity 162 of the shaft 158. A screen 163 may be employed to eliminate foreign matter from the cooling medium circulated through the roll. Mounted on the shaft 158 intermediate its ends is a shell 164 which preferably is of cast construction and formed with a series of internal annular recesses 165 communicating with one another through a plurality of circularly arranged ports 166. The shell 164 is provided with key-ways 167 which are adapted to engage keys 168 carried by the shaft 158, and the shell 164 is maintained from axial displacement by means of nuts 169 which are threaded onto the shaft 158 for engagement with the opposite ends of the shell. Washers 337 of suitable packing material may be interposed between the nuts 169 and the shell 164, to eliminate leakage of the cooling medium from the interior of the shell. A partition 170 is provided in the passage 159 adjacent one end of the shell 164.

As viewed in Figure 13, the shaft 158 to the right of the partition 170 is provided with a plurality of radially extending passages 171 which establish communication between the passage 159 and the intercommunicating channels 165 of the shell 164. The cooling medium entering the inlet pipe 160 will flow through the screen 163, through the passage 159, and through the passages 171, to the interior of the shell, and thence through radially extending passages 172 to the passage 159 on the opposite side of the partition 170, from where it is allowed to escape. From an inspection of Figure 15 it will be noted that the metal between the ports 166 abuts directly against the shaft 158, so that the shell 164 is braced against strain, at spaced points, both radially and axially. Also, in this form of construction the cast shell may be readily replaced without discarding the relatively expensive steel shaft.

It will be understood that any of the rolls may be driven through universal connections, to prevent transmission to the rolls of any gear thrust.
In Figures 17 and 18 there is shown another form of end dam construction, employing an annular end dam 173 of relatively large diameter. This end dam 173 comprises a plurality of arcuate sections 174 secured to one side of an internal ring gear 175 by means of screws 176. The ring gear 175 is disposed eccentrically with respect to the roll 177 and meshes with and is driven by a pinion 178 keyed to the roll shaft 179.

The ring gear 175 is supported by means of an idler gear 180 which is journaled on a stud shaft 181 fixed to a slide bearing 182 which is slidably mounted for substantially vertical adjustment in a slot 183 formed in a bracket 184 carried by a bearing 185 in which the roll shaft 179 is journaled. The slide bearing 182 is adjusted along the slot 183 by means of a screw 186 threaded into the bracket 184 and provided with an adjusting hand wheel 187. By adjusting the slide bearing 182 upwardly, the upper portion of the ring gear 175, and the end dam 173 carried thereby, are tilted to the right, as viewed in Figure 18, thus causing the end dam 173 to overlap the cooperating roll 188 to a greater extent, and resulting in an increase in the depth of the pool of molten metal. Conversely, if the slide bearing 182 is adjusted downwardly, this overlap between the end dam 173 and the roll 188 will be decreased, with the result that the depth of the pool is decreased.

The end dam 173 is maintained against lateral movement, to rotate always in a vertical plane, by means of upper and lower diametrically disposed stop screws 189 and 190, respectively, which are threaded into brackets 191 and 192 formed on the bearing 185, and which abut the outer side of the ring gear 175.

Metal sheared off by the teeth 193 on the end dam 173 falls upon an endless conveyor 194, and is deposited thereby in a receptacle 195, and from there is returned to the melting furnace, thus eliminating waste.

In Figures 19 and 20 there is shown a form of construction employing an oscillating end dam. This end dam 196 is pivotally mounted at its lower end, as indicated at 197, and extends upwardly in overlapping relation with each of the rolls 198 and 199, and is yieldably held in frictional engagement therewith by a coil spring 200, the tension of which may be adjusted by means of a set-screw 201 threaded into a lug 202 formed on the bearing 203 in which the roll shafts 204 and 205 are journaled. The end dam 196 is oscillated, to shear any metal which may cling thereto, and this oscillation is effected by means of an arm 206, one end of which is pivotally connected to the end dam 196, as indicated at 207, and the other end of which is provided with an eccentric strap 208 encircling an eccentric 209 fixed to a rotatable shaft 210. In this construction the rolls 198 and 199 are cooled by a cooling medium sprayed thereon from pipes 211, and excess moisture is removed from the rolls by means of wipers 212, and the rolls are kept clean by means of scrapers 213. The wipers 212 and scrapers 213 are carried by arcuate plates 214 which lie along the rolls 198 and 199, in spaced relation therewith, and which form chambers 215 for containing a body of cooling medium in contact with a large portion of the surfaces of the rolls.

In Figure 21 there is shown still another form of end dam, in which a disk 216 is secured to the end of the roll 217, for overlapping engagement with the roll 218. This disk 216 is provided with a plurality of radially extending teeth or ribs 219 on its inner face, provided with rounded edges, but effective to cooperate with the adjacent roll to remove any molten metal which may cling to the dam or which may be extruded outwardly from the solid mass of metal being rolled.

In Figure 22 there is shown still another form of end dam. In this construction the roll 220 is provided with an annular end dam 221 which is fixed to one end thereof, and the roll 222 carries an end dam 223 at the end opposite the end dam 221. The end dam 223 is mounted directly on a plurality of studs 224, which project outwardly from the roll 222 and are yieldably urged inwardly against the rolls 220 and 222 by means of coil spring 225 surrounding the studs 224 between the end dam 223 and the washers 226. The tension of these springs may be regulated by nuts 227 threaded onto the ends of the studs 224. This construction provides for a certain degree of yieldability in the event that the metal solidified between the rolls 220 and 222 should be forced outwardly to any great extent. In order to further reduce the tendency of metal to adhere to the end dams, the surfaces thereof may be treated with lamp black, graphite, whitewash, or the like, to reduce the conduction of heat from the metal to the end dams and thus, the tendency of the metal to freeze to the dams. For example, a coat of graphite may be maintained on the inner surfaces of the end dams 223 from graphite sticks 228 mounted in holders 229 and held in yieldable engagement with the end dams 223 by springs 230. Or the end dams may be coated with a film of carbon, by means of a burner 231 (Figure 23), which produces a flame giving off a relatively large amount of smoke.

In Figures 24 and 25 I have shown a cluster mill 338, comprising rolls 232 and 233 each provided with a pair of back-up rolls 234 and 235, and in connection with this mill I have shown another form of yieldable end dam. This end dam 236 is formed with a plurality of peripheral teeth 237 designed to cooperate with the sides of the rolls 232 and 233 to shear any overflow at the edges of the sheet being rolled. These teeth are bevelled, as indicated at 238, so that any metal sheared from the sheet will gravitate away from the end dam, and each end dam 236 is fixed to a shaft 239 journaled in a bearing 240 provided on the bearing 241 in which the forming rolls 232 and 233 and the back-up rolls 234 and 235 are journaled. A spring 242 surrounds each shaft 239 between the end dam 236 and the bearing 240, and yieldably urges the end dam 236 into operative engagement with the forming rolls 232 and 233. The outer end of each shaft 239 is operatively connected to the inner end of a driving shaft 243 by means of a spline coupling 244, thus to effect a positive driving connection between the shafts 239 and 243 and at the same time, to permit a limited axial movement of the shaft 239 and end dam 236 under the influence of the spring 242. The shaft 243 is journaled in a bearing 245 carried by the main bearing 241, and may be rotated by any suitable mechanism, not shown.

In Figures 26 and 27 there is shown still another form of end dam. This end dam 339 comprises a flexible metallic belt 246 carried by upper and lower pulleys 247 and maintained in frictional contact with the end of the rolls 248 and 249 by means of a plurality of backing rollers 250 rotatably mounted on a portion of the frame 251. The belt 246 may be driven in any desired manner, to constantly present a new surface to the metal in the pool between the rolls 248 and 249, and may be cooled, if desired.

In Figures 28 and 29 I have shown still another form of end dam 340, in which an endless chain 252 is provided, for carrying a plurality of blocks 253 for successive engagement with the ends of the rolls 254 and 255 and with the relatively hot metal disposed therebetween. The chain 252 is carried by upper and lower sprocket wheels 256 and 257, mounted respectively on shafts 258 and 259. The blocks 253 are maintained in frictional contact with the ends of the rolls 254 and 255 by means of an idler sprocket 260. The sprocket wheels 258 and 259 may be driven in any desired manner, to successively present relatively cool blocks to the metal in the pool between the rolls 254 and 255.

In Figures 30 through 32 there is shown still another form of end dam. In this construction two end dams 261 and 262 are disposed at opposite ends of the rolls, each comprising a substantially V-shaped block 263 of low-heat-conductivity refractory material, such as fire-brick or igneous rock. A metallic plug 264 is inserted in each block 263 adjacent the plane of nearest approach between the rolls 264 and 265, thus to provide for wear, which is greatest at this point. Each block 263 is supported by a flange 266 provided on the lower portion of a backing block 267 which also supports an intermediate block 268 similar in shape to the block 263 but constructed of firebrick cored out to provide a vertically extending passage 269 and an intercepting port 270 formed on the side of the block for communication with an overflow port 271 in the block 263. Any metal which may overflow from the pool between the rolls 264 and 265 will flow through the ports 271 and 270, to the vertical passage 269, and thence downwardly through this passage, and through a notch 272 provided in the flange 266, to a point where it may be collected and returned to the furnace.

The plate 267 of the end dam 261 is carried by a shaft 273 which extends through a bore 274 provided in a bearing block 275, and into a hollow screw plug 276 threaded into the bearing block 275. A coil spring 277 surrounds the shaft 273 between the block 267 and the screw plug 276, and yieldably urges the end dam 261 into operative engagement with the rolls 264 and 265. The plate 267 of the end dam 262 is carried by a shaft 527 slidably received within a bore 278 provided in a bearing structure 279, and maintained from rotating therein by means of a spline 280. The outer end of the shaft 527 is bevelled, as indicated at 281, for engagement by a correspondingly tapered end 282 of a vertically extending screw plug 283 threaded into the bearing structure 279. By rotating the screw plug 283, the end dam 262 may be adjusted relative to the rolls 264 and 265. Any expansion of the forming rolls 264 and 265 will be compensated for by the yieldable mounting of the end dam 261.

The end dams 261 and 262 may be heated by means of burners 284 located beneath these end dams to prevent the metal freezing to the dams and the solidification of metal within the passages 269.

Figure 33 discloses another embodiment of means for cooling a roll, and shows a roll 341 comprising an outer shell 285 shrunk onto an inner core 286 having a double thread on its circumferential periphery with which the inner surface of the shell 285 defines spiral passages 287 and 288. The passage 287 communicates at one end through a port 289 with an outer annular compartment 290 formed in a housing 291 and supplied with cooling medium through a supply pipe 292. The housing 291 is yieldably pressed against the end of the roll 341 by a spring 293, and is held against rotation by a bracket 294. At its opposite end the passage 287 communicates through a port 295 with an annular compartment 296 in a housing 297 held against rotation by a bracket 298. The spiral passage 288 at one end communicates through a port 299 with the compartment 296 and at its opposite end communicates with an inner annular compartment 300 formed in the housing 291 and emptying through a discharge pipe 301. By this construction circulation of the cooling medium is obtained in two directions simultaneously, and as a result, the variation in temperature between the incoming and outgoing cooling medium is offset, and uniform temperature is provided, from one end of the roll to the other.

In Figure 34 there is shown another means for cooling the rolls, in which water is supplied from supply pipes 302 to the space between the main rolls 303 and 304 and the back-up rolls 305, to form a lake of cooling water therebetween. The water in these lakes is retained by means of end dams 306 provided with overflow pipes 307. Hoods 308 may be provided above these lakes, to exclude any foreign matter therefrom, and also to prevent the water from splashing onto the rolls 303 and 304 just before they engage the molten metal in the pool between the forming rolls, thus to prevent the rapid generation of steam, the possible formation of bubbles or pockets in the metal being rolled, and the explosions, which otherwise might ensue.

In Figures 35 through 37 there are shown several types of forming rolls for rolling metal bars of different cross-sectional shapes.

The roll 309 of Figure 35 is provided with a V-shaped recess which cooperates with a V-shaped rib or projection provided on the roll 310. End dams 311 provided with toothed inner surfaces 312 may be provided in order to shear the metal from the edge of the bar being rolled. The particular configuration of these rolls produces a bar of angular cross-section.

In Figure 36 the roll 313 is provided with a relatively flat central portion 314, and with relatively deep recesses 315 at opposite ends thereof. End dams 316, similar to those previously described in connection with Figure 35, may be provided if desired. The cooperating roll 317 is formed with a relatively narrow flat portion 318 for imparting the desired flat configuration to the base of the bar. The particular configuration of these rolls produces a bar of channel cross-section.

In Figure 37 the rolls 319 and 320 are each provided with a relatively narrow flat central portion 321, and with relatively deep recesses 322 on each side thereof. End dams 323, similar to those previously described, are secured to the roll 319 in spaced relation to the central portion 321. Rolls of this construction cooperate to roll a bar of I cross-section. In Figure 38 there are shown forming rolls 324 and 325 provided with corrugated rolling surfaces which present a greater surface area to the metal in the pool, with resultant increase of cooling, thereby permitting the rolling of sheets of metal of greater thickness. A strip of metal rolled by these rolls necessarily will be of corrugated formation, as indicated at 326, and therefore, will be passed between a pair of rollers 327 to remove the corrugations, and produce a sheet of flat formation, if a flat sheet is desired.

Figure 39 shows the characteristic action with an open pool or lake. When the metal is delivered in molten condition to the cooled rolls it solidifies contiguous the rolls, in zones 328 of progressively increasing thickness. Beyond these solidified zones 328 are zones 329 where the metal is plastic, and centrally is a zone 330, where the metal is clearly liquid.

However, instead of supplying the molten metal as an open lake disposed in the space defined by the end dams and the upper surfaces of the rolls, I may supply the molten metal by way of a gate disposed in the space, particularly in the case of the metals of lower melting point, such as lead, and in Figures 40 through 45 I have shown an apparatus particularly adapted for this purpose.

The embodiment shown in Figures 40 through 45 comprises a melting pot 411, of any suitable construction, for melting the material to be cast, and on top of the melting pot 411, and secured thereto as by bolts 412, is a base plate 413 on which the mechanism is mounted.

Rising from the base plate 413, secured thereto as by machine screws 414, are a pair of side plates 415 each provided with open end slots 416 in which are received bearing blocks 417 in which are journaled the supporting journals 418 of a pair of cooperating rolls 419 each adapted to form a fractional strip which when placed back to back with the fractional strip of the other roll will form the complete unitary strip desired.

The two rolls 419 are urged against each other by means of screws 420 operated by handles 421 and terminating in swiveled feet 422 bearing against the pair of journal blocks 417 near the open end of the slots 416 of the side plates 415. The screws 420 are screw threadedly received within bosses 423 formed upon end plates 424 secured to the side plates 415 as by machine screws 425 and in position bridge the open ends of the slots 416.

The rolls 419 are rotated by means of a motor 426 energized through conductors 427 under the control of a switch 428 and actuating the rolls 419 through a suitable reduction gearing 429 operating a pinion 430 meshing with a gear 431 secured on one trunnion 418 of the inner of the rolls 419 and meshing with a like gear 432 secured on one trunnion of the outer of the rolls 419, and the rolls 419 are maintained cool by means of cooling water which is introduced into the rolls 419 from an inlet duct 433 through the central apertures 342 of the trunnions 418 at one side of the rolls 419 and flows from the rolls 419 through the central apertures 343 of the trunnions 418 at the other side of the rolls 419 into cooperating outlet ducts 434.

Positioned above the rolls 419, in the crotch therebetween, is a single double face gate 435 having faces 436 curved to correspond to the curvature of the rolls 419 and provided with openings 437 positioned along the length of the rolls 419.

This embodiment of my invention is particularly designed for use in casting storage battery grids, and accordingly the rolls 419 are provided with grooving in the form of a rectangular frame having a protruding lug at one upper corner, having the two lateral edges connected by rather widely spaced cross grooves which register on the two rolls 419, and having the space between cross grooves rather closely filled with longitudinal grooves which alternate on the two rolls 419, thus to produce a battery grid having a relatively heavy frame, with a lug rising therefrom, and having within the frame a plurality of rather heavy vertical ribs supporting a large number of horizontal half ribs.

The gate 435 is held in close engagement with the two rolls 419 by the action of weights 438 pivoted at 439 to the side plates 415 and connected intermediately at 440 to links 441 pivoted at their upper ends to forks 442 formed at the lower ends of links 443 which are provided at their upper ends with overhangs 444 in which are pivoted levers 445 rounded at their lower ends at 446 to seat within recesses 447 formed in the upper face of the gate 435, while pivotally received within the forks 442 of the links 443 are a pair of terminals 448 connected respectively to an inlet duct 449 and an outlet duct 450 and provided with annular bosses 451 adapted to be received within apertures 452 formed in the lower face of the gate 435 and communicating with a chamber 453 enclosed by the walls of the gate 435, the entire construction being such that with the toggle levers straightened the gate 435 is clamped tightly against the fittings 448 to connect the inlet ducts 449 and 450 to the chamber 453 of the gate 435, and at the same time the gate 435 is directly connected, so that the entire pull of the weights 438 is acting to force the gate 435 into close engagement with the rolls 419, while with the levers 445 swung, the gate 435 is released simultaneously from the fittings 448 and from the pull of the weights 438, thus to permit ready removal of the gate 435.

The inlet duct 449 is connected to the outlet of a pump (not shown) mounted within the melting pot 411 and driven by means of a shaft 454 operated through bevel gears 455 and 456 from the shaft 457 of a motor 458 mounted on the base plate 413 and energized through conductors 459 under the control of a switch 460.

The return duct 450 leads back into the melting pot 411 and is provided so that there may be delivered to the gate 435 a quantity of hot material considerably in excess of the amount required for casting, thus to circulate through the chamber 452 of the gate 435 a current of heated material serving to maintain the gate 435 at the desired heat.

Also serving to heat the gate 435, either continually, to assist the action of the circulating current of heated material, or preliminarily, before the circulation of the material begins, are two supplemental means. The first of these consists of a pair of electric resistance units 461 connected in series and energized through conductors 462 under control of a switch 463, while the second of these consists of a transformer 464 having its primary 465 energized through conductors 466 under control of a switch 467 and having its secondary 468 connected by conductors 469 to the two ends of the gate 435, the transformer 464 being wound to produce in the secondary 468 a low voltage current of large magnitude, thus to pass through the gate 435 a current of a magnitude to produce a considerable heating effect in the gate 435 because of the resistance thereof.

In this embodiment the inlet and outlet ducts 449 and 450 are shown as heated by electric heating elements 470, energized through conductors 471 under control of a switch 472. In this embodiment fluid fuel is supplied to the pot 411 through a duct 474 under control of a valve 475, the cooling water for the rolls 419 is controlled by a valve 476 in the inlet duct 433, and the switches 428, 460, 463, 467, and 472, are all mounted in a single control panel 477 secured by machine screws 478 to one edge of the base plate 413 and receiving energy through conductors 479 connected to any suitable source of electrical energy.

In operation, the heated material to be cast is supplied to the gate 435 through the supply duct 449 and flows through the gate aperture 437 onto the faces of the rolls 419 as the rolls 419 rotate past the gate 435. The surface of the casting in contact with the rolls 419 solidifies almost instantly, because of the relatively low temperatures at which the rolls 419 are maintained, while the back surfaces of the fractional castings in contact with the gate 435 remain incompletely solidified, due to the relatively high temperature at which the gate 435 is maintained, and in this condition the fractional castings meet each other back to back, at the bight of the rolls 419, and there are united into the desired single unitary casting.

Of course it will be understood that at the time the unitary casting emerges from between the rolls 419 the interior thereof may or may not have set, and that whether or not the interior thereof has set is entirely immaterial, since the outer faces are already firm. Also, that by forming the casting in this manner draw may be produced in two directions, a feature which makes the apparatus herein described particularly advantageous for the formation of storage battery grids. Also it will be understood that the material during its circulation is maintained against loss of heat by the heating elements 470 encircling the supply and return ducts 449 and 450, that the gate 435 is brought up to heat by the current from the transformer 464, or by the electric heating elements 461, or by a combination of the two, and is maintained at the desired temperature by the circulation of excess heating material therethrough, by the passage of current therethrough from the transformer 464, or by the electric heating element 461, or by any combination thereof.

Of course it will be understood that various other means may be employed to heat the gate 435, or to maintain the material against loss of temperature, or for cooling the rolls 419, or to connect the gate 435 to its supply and return ducts 449 and 450 and place the gate 435 against the rolls 419.

Also it will be understood that the apparatus may be used either for making a succession of separate castings, in which event each casting will drop free from the rolls 419, and will be delivered by a trough 480, or the apparatus may be used to produce a continuous strip casting, in which event the casting may pass from the rolls 419 about an idler roller 481 mounted on the ends of arms 482 pivoted on the pivots 439 of the weights 438 and biased by springs 483 into contact with a cooperating roller 484 driven by a chain 485 from a sprocket 486 mounted on one of the trunnions of the inner roll 419, the roller 481 serving as a fulcrum about which the continuous strip casting may bend, so as to pass out of the apparatus above the chute 480, and the roller 484 serving to insure that the continuous strip casting is removed or stripped from the rolls 419.

Under certain conditions I find it desirable to provide some means for partially cleaning the rolls 419, and accordingly in this embodiment I provide scrapers 487 engaging the circumferential grooves in the rolls 419 and secured by machine screws 488 to a cross plate 489 secured to the side plates 415, and under some conditions I find it desirable to provide means for preventing finning of the metal over the raised portions of the rolls, and accordingly in this embodiment I provide an oil trough 490 mounted upon the scrapers 487 and carrying rotatably mounted therein a roller 491 effective to apply to the raised portions of the rolls 419 a thin portion of oil which not only lubricates the rolls 419 as regards the gate 435 but also vaporizes as the hot material strikes the rolls, to form a pressure sufficient to prevent the hot material finning over onto the raised portions of the rolls.

Under some circumstances it might be desirable to provide means for preventing the metal flowing in reverse direction along the circumferential roll grooves, and in such case I may provide a series of dams riding in the circumferential grooves of the rolls 419, each shaped to substantially fit its groove, and all terminating above the aperture 437 of the gate 435, and loosely mounted to permit lateral adjustment upon contraction or expansion of the rolls 419 resulting from change in temperature thereof, but ordinarily the speed of operation of the apparatus is sufficient to prevent this action, and accordingly, for simplicity, I have omitted from the drawings any disclosure of these dams.

For various reasons I prefer to form the gate 435 of a material of the nature of copper. It will be understood, however, that the heating current need not flow through the entire gate, but may flow through any suitable conductor, for example, through a thin strip facing the gate, or through the casting material within the gate, or through the casting material outflowing through the sprue aperturing of the gate, so that in this respect the term gate includes any suitable part of the gate assembly.

Also it will be understood that the amount of heat transmitted to the gate from the casting material may be varied by varying the output of the pump, and also, that the pressure forcing the material through the sprue aperturing may be controlled in the same manner, or may be controlled by suitable by-passing.

In addition, it will be understood that this embodiment of Figures 40 through 45 may be used to form strips or articles of any other configuration, including plain sheet, and also, for rolling as well as by casting, depending, as hereinbefore discussed, on the extent of solidification relative to the spacing of the rolls, controllable by the same factors heretofore discussed, but in this embodiment requiring also that the gate be spaced from the rolls the proper distance relative to the spacing of the rolls themselves.

In Figure 46 I disclose means for heating the rolls, comprising manifolds 344 extending parallel to the rolls 345, receiving liquid fluid fuel through ducts 346 controlled by valves 347, and provided with a plurality of nozzles 348 by which the flame is impinged against the rolls 345. I may use roll heating means in connection with any form of roll, and also, I may use roll heating means in any situation where it is desirable, but I find that heating of the rolls is particularly desirable in working with metals of high melting point, to preheat the rolls before the initiation of the delivery of the metal to the rolls, in order to prevent the objectionable effects which otherwise might ensue, such as granular freezing of the metal, and in fact, possibly even the cracking of the rolls themselves.

Figure 47:
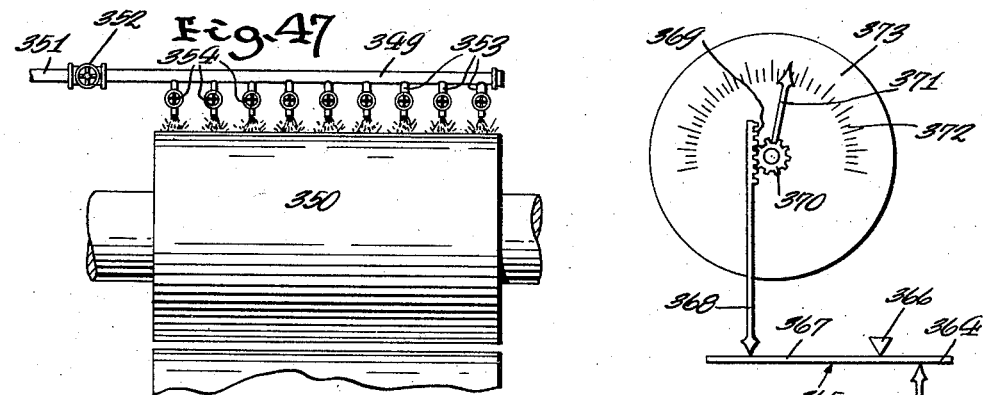
Figure 47 is a detail view showing means for cooling the rolls selectively.

In Figure 47 I show means for cooling the rolls in varying degree at various points along the length of the rolls, and I find that this is desirable, under certain circumstances, and with certain types of rolls, particularly, in order that the degree of cooling may correspond at each point along the length of the rolls to the degree of heat absorption from the metal at that point. The particular means disclosed in Figure 47 comprises a manifold 349 exending parallel to the roll 350, receiving cooling fluid from a main duct 351 under control of a main valve 352, and discharging the cooling fluid against the roll 350 through a plurality of branch ducts 353 spaced along the length of the manifold 349 and each controlled by an individual branch valve 354. It will be obvious that this means is only alternative, and also, that this or some other means for differential cooling may be applied to any roll construction, whenever the result is desired.

The various embodiments of apparatus are illustrated as particularly advantageous in effecting the control of the extent of solidification, and therefore, with any given metal, and with any spacing of the rolls, the extent of solidification relative to the spacing of the rolls, and the characteristics of the strip S.

Figure 48:
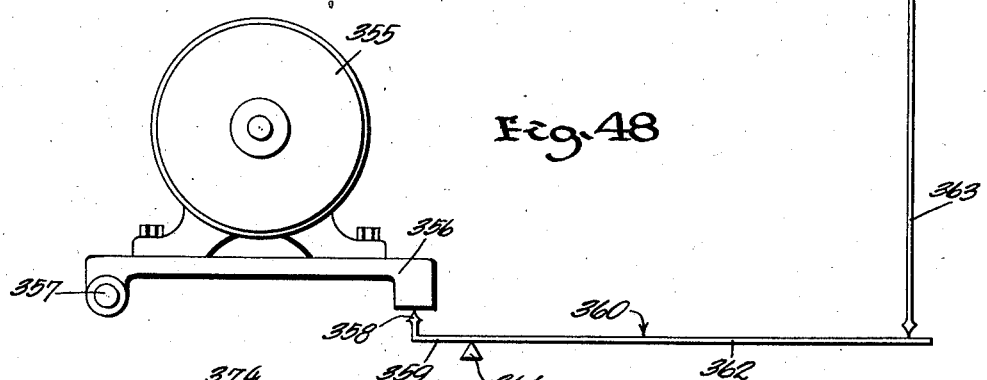
Figure 48 is a view showing one form of suitable torque indicator.

I find that I may effect the control of the one or more coordinately varied factors manually, by a skilled operator, acting in response to one or more suitable indications of condition. In this connection, I also find that the torque required to drive the mill follows the ratio between the extent of solidification and the spacing of the rolls, increasing with increase of the ratio between the extent of solidification and the spacing of the rolls, and decreasing with decrease in the ratio between the extent of solidification and the spacing of the rolls, and accordingly, when the control of the one or more coordinately varied factors is manual, I find it particularly advantageous to provide means to indicate continuously the torque required to drive the mill. This means may be in the form of a torque indicator T of any suitable construction, shown in Figures 1 and 2 as interposed in the drive 57 from the motor 56 to the rolls 51 and 52, or this means may be in the form shown in Figure 48, wherein I have shown the mill motor 355 as mounted on a base 356 pivoted at one end at 357 and resting at the other end on the knife edge 358 carried on the short arm 359 of a lever 360 pivoted at 361 and having its long arm 362 connected by a link 363 to the short arm 364 of a lever 365 which in turn is pivoted at 366 and has its long arm 367 engaging a reciprocating bar 368 carrying a rack 369 which cooperatively engages a pinion 370 to which is secured an indicator arm 371 cooperating with the scale 372 of an indicator 373. Depression of the free end of the base 356 is opposed continually in constantly increasing amount, by any biasing means suitable for the purpose, as in a scale.

Regardless of the form of torque indicator, it of course is desirable to have the indicator constructed for adjustment to show deviation from normal, and to show deviation from normal regardless of the inclusion in the drive of one or more variable speed transmissions such as the variable speed transmission V shown in Figures 1 and 2 as included in the drive 57 from the motor 56 to the rolls 51 and 52.

Figure 49:
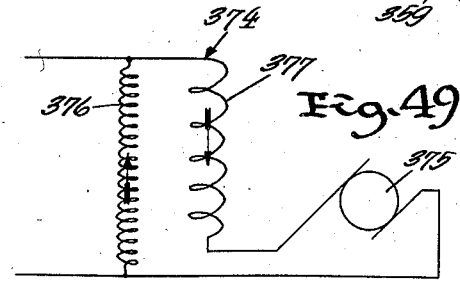
Figure 49 is a diagrammatic representation of a driving motor for automatic control.

On the other hand, while the coordination of the factors controlling the characteristic of the strip S may be effected manually, I find that this coordination also may be effected automatically. For example, I may drive the mill by the differential series field compound motor 374 disclosed in Figure 49 and comprising an armature 375 acting under the influence of the field resulting from the combined action of a shunt coil 376 and of a series coil 377 wound to set up a field in opposite direction to the field generated by the shunt coil 376, whereby, increase in current through the motor 374, resulting from increase in torque required to operate the mill, by increase in the reverse series field, will automatically decrease the resultant field, and increase the speed of the motor 374 and of the mill, whereas decrease in torque required to drive the mill will decrease the current through the motor 374, to decrease the field generated by the series coil 377, to increase the resultant field, and to decrease the speed of the motor 374. The extent of the action of the series field of course will be limited, as is well known in the art, to prevent preponderance of the series field.

Of course with a motor of this type, effecting control automatically, it is only necessary to coordinate initially for the nature of the metal and the spacing of the rolls and the characteristic desired in the strip'S, after which the motor 374, properly constructed, will maintain the coordination automatically.

However, while automatic control undoubtedly is desirable, under many circumstances it is not desirable to vary the speed of operation of the mill, and in those circumstances I may secure automatic control by means of the control mechanism disclosed in Figure 50.

In Figure 50 I have shown a main mill motor 378, which may be a three-phase squirrel-cage induction motor, connected by conductors 379 and 380 and 381 to a mill motor starter 382 fed from line wires 383 and 384 and 385 and of any type suitable for the purpose. The control means of Figure 50 also comprises a control motor 386 of the three-phase wound-rotor induction type, connected by means of conductors 387 and 388 and 389 to a reversing and control switch 390 which in turn is connected to the line wires 383 and 384 and 385 by means of connecting conductors 391 and 392 and 393 and is operative in its upper position to connect the control motor 386 for operation in one direction, and in its lower position, to connect the control motor 386 for operation in the reverse direction, as will be understood from the diagram of connections. Mounted on the shaft of the control motor 386 are three slip rings 394 and 395 and 396 connected to the rotor winding, as is well known in the art, and engaged by brushes (not shown) connected to conductors 397 and 398 and 399 leading to resistances 400 and 401 and 402 connected together at their opposite ends by a T-conductor 403, whereby the control motor 386 operates normally with the resistances 400 and 401 and 402 interposed in the armature circuit. However, leading from the conductors 397 and 398 and 399 connecting the slip rings 394 and 395 and 396 to the resistances 400 and 401 and 402 are conductors 404 and 405 and 406 leading to a normally open switch 407 adapted to connect together the conductors 404 and 405 and 406, to short circuit the resistances 400 and 401 and 402, to remove these resistances from the armature circuit of the motor 386, thus to short circuit the armature of the motor 386, to correspondingly increase the speed of the motor 386, whenever the speed switch 407 is closed.

The control switch 390 is moved to forward position by means of a forward solenoid 408, and to reverse position by means of a solenoid reverse 409, and the speed switch 407 is moved to closed position by a solenoid 410, while the switch 390 comprises also an auxiliary switch 525, comprising a contact arm 492 adapted to engage with a forward contact 493 when the control switch 390 is in forward position, and with a reverse contact 494 when the control switch 390 is in reverse position.

Interposed in the conductor 391 from the mill motor starter 382 to the mill motor 378 are a series of relays 495, 496, 497, 498, 499, and 500, responsive to current flowing in the conductor 381, and set to operate at progressively increasing values, in the order named, the relays 495 and 496 and 498 being in the nature of over-load relays, each opening on the passage of current in excess of the value predetermined for that relay, and the relays 497 and 499 and 500 being in the nature of under-load relays, each closing on the passage of current of a value greater than that predetermined for that relay.

Under these circumstances, with the mill motor starter 382 in the off position, the relays 495 and 496 will be in closed position, the relay 497 will be in open position, the relay 498 will be in closed position, and the relays 499 and 500 will be in open position, and this condition will continue until the current in the line 381 reaches a value in excess of the predetermined value at which the relay 495 will operate.

Accordingly, when the mill motor starter 382 is closed, current will flow not only to the mill motor 378, but also, from the main conductor 381 through conductors 501 and 502, the switch of the relay 495, conductors 503 and 504, the coil 410 of the speed switch 407, and conductors 505 and 506 and 507, back to the main conductor 380, thus energizing the coil 410, to close the speed switch 407, to short circuit the resistances 400 and 401 and 402 in the armature circuit of the control motor 386, to connect the control motor 386 for operation at the maximum speed. Simultaneously, the relay 496 also being closed, current will flow from the main conductor 381 through conductors 508 and 509, the forward coil 408 of the control switch 390, conductors 510 and 511, the switch of the relay 496, conductors 512 and 513, and conductor 507, back to the main conductor 380, to energize the forward coil 408 of the control switch 390, to move the control switch 390 into the forward position, and connect the control motor 386 to operate forwardly, and by reason of the fact that the speed switch 407 is closed, to operate at maximum speed. Directly the control switch 390 has moved into the upper or forward position the switch arm 492 of the auxiliary switch 525 will engage the forward contact 493, and this will close a second circuit through the forward coil 408 of the control switch 390, extending from the main conductor 381 through the conductors 508 and 509, the coil 408 of the control switch 390, the conductor 510, a conductor 514, the switch of the relay 498, a conductor 515, the auxiliary switch contact 493 and the auxiliary switch arm 492, a conductor 516, and the conductor 507, back to the main conductor 380.

As the current in the conductor 381 increases, the relay 495 will open, to open the circuit through the coil 410 of the speed switch 407, to interpose the resistances 400 and 401 and 402 in the armature circuit of the control motor 386, to reduce the speed of operation of the control motor 386. Then, as the current in the conductor 381 increases further, the relay 496 will open, to interrupt the circuit through the forward coil 408 of the control switch 390 by way of the switch of the relay 496, but this will be ineffective, by reason of the fact that the circuit through the coil 408 is also completed through the switch of the relay 498. As the current in the main conductor 381 increases still further, the relay 497 will operate to close its switch, but this also will be ineffective, because of the fact that by the conductor 517 the relay 497 is in series with the auxiliary switch 525 of the control switch 390, and that the arm 492 of the auxiliary switch 525 is in forward position, in engagement with the forward contact 493, rather than in reverse position, in engagement with the reverse contact 494, to which the switch of the relay 497 is connected. However, as the current in the main conductor 381 increases still further, it reaches the value predetermined for the relay 498, and the relay 498 opens, interrupting the last circuit through the forward coil 408 of the control switch 390, to permit the control switch 390 to return to neutral position, under the action of biasing means of any suitable type (not shown). It will be noted however that this still does not bring the switch arm 492 of the auxiliary switch 525 into contact with the reverse contact 494, so that the fact that the switch of the relay 497 is closed still is of no consequence.

However, as the current in the main conductor 381 increases still further, the relay 499 operates, to close its switch, and a circuit is then completed from the main conductor 381 through the conductor 508, a conductor 518, the reverse coil 409 of the control switch 390, conductors 519 and 520, the switch of the relay 499, a conductor 521, and the conductors 506 and 513 and 507, back to the main conductor 380, to energize the reverse coil 409 of the control switch 390, to move the control switch 390 into reverse position, to connect the control motor 386 for operation in the reverse direction. When the control switch 390 is thus moved to reverse position the switch arm 492 of the auxiliary switch 525 contacts the reverse contact 494, and this completes a second circuit through the reverse coil 409 of the control switch 390, extending from the main conductor 381 through the conductors 508 and 518, the reverse coil 409 of the control switch 390, the conductor 519, a conductor 522, the switch of the relay 497, the conductor 517, the contact 494, the auxiliary switch arm 492, and the conductors 516 and 507, back to the main conductor 380. If the current in the main conductor 381 continues to increase, and reaches the value predetermined for the relay 500, the switch of the relay 500 will be closed, to complete a circuit from the main conductor 381 through the conductor 501, a conductor 523, the switch of the relay 500, a conductor 524, the conductor 504, the coil 410 of the speed switch 407, and conductors 505 and 506 and 513 and 507, back to the main conductor 380, to again energize the coil 410 of the speed switch 407, to close the speed switch 407, to short circuit the resistances 400 and 401 and 402 in the armature circuit of the control motor 386, to set the control motor 386 operating again at full speed, but this time in the reverse direction. However, if the current in the main conductor 381 decreases instead of increasing, it first will drop below the predetermined value for the relay 499, and the relay 499 will open, to open the circuit through the reverse coil 409 of the control switch 390 by way of the switch of the relay 499, but this will be immaterial, since an alternative circuit is closed through the reverse coil 409 of the control switch 390, by way of the switch of the relay 497. As the current in the main conductor 381 decreases further, the switch of the relay 498 will close, but this will be immaterial, because the switch of the relay 498 is in series with the forward contact 493 of the auxiliary switch 525, and the switch arm 492 of the auxiliary switch 525 is in engagement with the reverse contact 494 rather than with the forward contact 493. However, if the current decreases still further, the relay 497 will operate, to open its switch, and this will break the second circuit through the reverse coil 409 of the control switch 390, and the control switch 390 will return to neutral position, to disconnect the control motor 386.

Thereafter, increase in current in the main conductor 381 will repeat the cycle heretofore described, while further decrease in current in the main conductor 381 will again close the switch of the relay 496, to again close the circuit through the forward coil 408 of the control switch 390, to operate the control motor 386 in the forward direction, until the current in the main conductor 381 exceeds the predetermined value for operation of the relay 498, either with or without operation of the relay 495 to throw the control motor 386 into full speed, according to whether or not the current in the main conductor 381 falls below the value predetermined for operation of the relay 495.

Under these circumstances we have the situation that when the current to the mill motor 378 falls below the value predetermined for the relay 496 the control motor 386 operates in a forward direction until such time as the current to the mill motor 378 exceeds the value predetermined for the second succeeding relay 498, and then rests, until the current to the mill motor 378 either again drops below the value predetermined for the relay 496, in which case this cycle is repeated, or rises above the value predetermined for the relay 499, in which case the control motor 386 is operated in the reverse direction, until the value of the current to the mill motor decreases to below the value predetermined for the intermediate relay 497, whereupon the control motor again rests, until the current to the mill motor 378 again rises above the value predetermined for the relay 499, in which case the control motor is again actuated in the reverse direction, or alternatively, again falls below the value predetermined for the relay 496, in which case the control motor 386 is again actuated in the forward direction. With this addition, that upon excessive departure from normal the relays 495 and 500 are brought into play, to short circuit the resistances in the armature circuit of the control motor 386, to increase the speed of the control motor 386, to expedite the return to normal.

I have heretofore pointed out that the torque required to drive the mill follows the ratio between the extent of solidification and the spacing of the rolls, and of course the current required by the mill motor 378 follows the torque required to drive the mill, wherefore, the current in the main conductor 381, acting on the relays 495 and 496 and 497 and 498 and 499 and 500, with any given metal, and with any given spacing of the rolls, and with calibration accordingly, follows the ratio of the extent of solidification of the metal to the spacing of the rolls, and this ratio therefore may be maintained constant automatically, merely by suitably connecting the control motor 386 to any one or more means controlling one or more of the factors governing the extent of solidification.

For example, I may connect the control motor 386 through suitable gearing to the rod 526 carrying the stopper 77 controlling the outlet opening 75 of the ladle 76 of Figure 3, so that as the current in the main conductor 381 is low, by reason of low extent of solidification, the control motor 386 will operate through suitable intermediate gearing to raise the valve 77, to increase the flow of metal to the rolls, and thus, to increase the arc of contact between the metal and the rolls, to correspondingly increase the extent of solidification, while if the current in the main conductor 381 is high, by reason of high torque resulting from increase in extent of solidification, the control motor 386 will lower the valve 77, to decrease the flow of metal to the rolls, to decrease the arc of contact, to decrease the extent of solidification. Or the control motor 386 may be connected to the top-pour ladle 97 of Figure 7, to accomplish the same result by raising and lowering the angle of the ladle. Or to the tilting mechanism for the tilting of the Bessemer converters 93 and 94 of Figures 5 and 6. Or alternatively, the end dams 261 and 262 of Figures 30 through 32 may be made vertically adjustable, and the control motor 386 may be connected to raise and lower these end dams 261 and 262, to control the arc of contact between the metal and the rolls by controlling the elevation of the overflow. Or the control motor 386 may be connected to the slides 182 of Figures 17 and 18, to secure the same result. Or the control motor 386 may be connected to any of the valves for controlling the flow of cooling fluid to the rolls, to accomplish the result by controlling the temperature of the rolls, or alternatively, to a suitable series of electric contactors, to accomplish the result by increasing or decreasing the applicaption of heat to the metal reaching the rolls.

Whichever arrangement is employed, the control means of Figure 50, properly set to correspond to the nature of the metal being worked, the existent spacing of the rolls, and the kind of strip desired, will automatically coordinately vary one or more of the factors governing the extent of solidification, automatically to maintain constant the characteristic of the continuous strip S emerging from the mill.

Through controllable coordination I may obtain and continuously maintain conditions to effect solidification of the metal in a thickness somewhat greater than the spacing of said rolls, to deliver the metal as rolled metal.

Operating in this way, and with steel as the metal, there may be obtained the microstructure shown by the microphotograph reproduced in Figure 51 and characterized by very fine and even structure, highly uniform carbon distribution, a hard outer surface, as indicated at 331, and a soft core, as indicated at 332, while on re-rolling there may be obtained the microstructure shown by the microphotograph reproduced in Figure 52 and characterized by the conversion of the hard outer surface 331 and the soft core 332 into a step of uniform hardness throughout.

From the foregoing it will be obvious that I have accomplished at least the principal object of my invention, but at the same time, it also will be obvious that my invention is not limited to the disclosure herein set forth, but on the contrary, that the disclosure herein is illustrative only.

I claim:

1. The process of producing a cast metal product directly from the molten metal which comprises disposing the molten metal in a space at one side of the points of tangency of two juxtaposed rolls maintained at a temperature to solidify and cast said metal contiguous to said rolls, and rotating said rolls at a coordinated speed to move the thus-solidified, cast metal between said rolls in a thickness practically equal to the spacing of said rolls, whereby a product is ejected from said rolls having a cast structure and having a thickness substantially equal to the spacing between said rolls without subjecting said cast structure to work.

2. The process of producing a cast metal strip directly from the molten metal which comprises disposing the molten metal in a space at one side of the points of tangency of two juxtaposed rolls maintained at a temperature to solidify and cast said metal contiguous to said rolls, rotating said rolls, and controlling the duration of contact of said molten metal with said rolls whereby a product is ejected from said rolls having a cast structure and having a thickness substantially equal to the spacing between said rolls without subjecting said cast structure to work.

3. The process of producing a cast metal strip directly from the molten metal which comprises disposing the molten metal in a space at one side of the points of tangency of two juxtaposed rolls maintained at a temperature to solidify and cast said metal contiguous to the bight of said rolls, rotating said rolls without compressing said cast metal to any substantial extent, and varying the speed of rotation of said rolls to coordinate duration of solidification with the speed of rotation of said rolls whereby a product is ejected from said rolls having a cast structure and having a thickness substantially equal to the spacing between said rolls without subjecting said cast structure to work.

4. The process of producing a cast metal strip directly from the molten metal which comprises disposing the molten metal in a space at one side of the points of tangency of two juxtaposed rolls maintained at a temperature to solidify and cast said metal contiguous to said rolls, rotating said rolls without compressing said cast metal to any substantial extent, and varying the area of said metal subject to the influence of said rolls to control the duration of solidification and to coordinate such solidification with the speed of rotation of said rolls whereby a product is ejected from said rolls having a cast structure and having a thickness substantially equal to the spacing between said rolls without subjecting said cast structure to work.

5. The process of producing a cast metal strip directly from the molten metal which comprises disposing the molten metal in a space at one side of the points of tangency of two juxtaposed rolls maintained at a temperature to solidify and cast said metal contiguous to said rolls, rotating said rolls without compressing said cast metal to any substantial extent, and varying the temperature of said rolls for coordinating solidification action of said metal with respect to the speed of rotation of said rolls whereby a product is ejected from said rolls having a cast structure and having a thickness substantially equal to the spacing between said rolls without subjecting said cast structure to work.

6. The process of producing a cast metal strip directly from the molten metal which comprises restricting the molten metal to a space at one side of the points of tangency of two juxtaposed rolls maintained at a temperature to solidify and cast said metal contiguous to said rolls, rotating said rolls at a coordinated speed to move the thus-solidified, cast metal between said rolls in a thickness substantially equal to the spacing of said rolls, and to deliver said metal in a cast, solid condition, and preventing the cooling of an excess of thickness of solidified metal on said rolls along the edges of said metal strip which tends to obstruct continuous controlled rotation of said rolls.

7. The process of producing a metal strip directly from the molten metal which comprises disposing the molten metal in a space at one side of the point of tangency of two juxtaposed rolls maintained at a temperature to solidify and cast said metal contiguous to said rolls, rotating said rolls at a coordinated speed to move the thus-solidified, cast metal between said rolls in a thickness substantially equal to the spacing of said rolls without compressing said cast metal to any substantial extent, and then rolling said strip on the same heat and without reheating.

8. The process of producing a metal strip directly from the molten metal, which comprises disposing the molten metal in a space at one side of the points of tangency of two juxtaposed rolls maintained at a temperature to solidify and cast said metal contiguous to said rolls, rotating said rolls at a coordinated speed to move the thus-solidified, cast metal between said rolls in a thickness substantially equal to the spacing of said rolls without compressing said cast metal to any substantial extent, and finishing said strip of metal on the same initial heat.

9. The process of producing a metal strip directly from the molten metal which comprises disposing the molten metal in a space at one side of the points of tangency of two juxtaposed rolls maintained at a temperature to solidify and cast said metal contiguous to said rolls, rotating said rolls at a coordinated speed to move the thus-solidified, cast metal between said rolls in a thickness substantially equal to the spacing of said rolls without compressing said cast metal to any substantial extent, and forming an article from said strip on the same initial heat.

10. The method of producing solid cast metal of substantially constant cross section throughout its length directly from a mass of molten metal which comprises establishing a bath of molten metal between a pair of adjacent and operatively associated rolls, providing a moving dam at each end of the rolls to maintain the molten metal in said bath, rotating said rolls to cause the ejection of solidified metal having a cast structure from the bight of the rolls without compressing said cast metal to any substantial extent, and controlling the thermal conditions so that the temperature of the solidified, cast metal at the bight of the rolls is substantially the same in the zones adjacent to the dams and the intermediate zones of the molten bath.

11. The method of producing solid cast metal of substantially constant cross section throughout its length directly from a mass of molten metal which comprises establishing a bath of molten metal between a pair of adjacent and operatively associated rolls, providing a dam at each end of the rolls to maintain the molten metal in said bath, rotating said rolls to cause the ejection of solidified metal having a cast structure from the bight of the rolls without compressing said cast metal to any substantial extent, and controlling the thermal conditions so that the temperature of the solidified, cast metal at the bight of the rolls is substantially the same in the zones adjacent to the dams and the intermediate zones by regulating the amount of heat supplied to the various zones of the bath.

12. The method of producing solid cast metal of substantially constant cross section throughout its length directly from a mass of molten metal which comprises establishing a bath of molten metal between a pair of adjacent and operatively associated rolls, providing a dam at each end of the rolls to maintain the molten metal in said bath, rotating said rolls to cause the ejection of solidified metal having a cast structure from the bight of the rolls without compressing said cast metal to any substantial extent, and controlling the thermal conditions so that the temperature of the solidified, cast metal at the bight of the rolls is substantially the same in the zones adjacent to the dams and the intermediate zones of the molten bath, the said controlling operation involving introducing a larger amount of molten metal to those regions of the bath adjacent to the dams at the end of the rolls whereby compensation is made for excess cooling of said dams.

13. The method of producing solid cast metal of substantially constant cross section throughout its length directly from a mass of molten metal which comprises establishing a bath of molten metal between a pair of adjacent and operatively associated rolls, providing a movable dam at each end of the rolls to maintain the molten metal in said bath, rotating said rolls to cause the ejection of solidified metal having a cast structure from the bight of the rolls without compressing said cast metal to any substantial extent, and controlling the thermal conditions so that the temperature of the solidified, cast metal at the bight of the rolls is substantially the same in the zones adjacent to the dams and the intermediate zones of the molten bath, the said controlling involving the regulation of the heat supplied to and abstracted from the ends of the rolls and associated dams whereby compensation is effected for excess cooling of the ends of the rolls and/or dams, and whereby the solidification of excessive solid metal at the ends of the rolls is avoided.

14. The method of producing solid cast metal of substantially constant cross section throughout its length directly from a mass of molten metal which comprises establishing a bath of molten metal between a pair of adjacent and operatively associated rolls, providing a movable dam at each end of the rolls to maintain the molten metal in said bath; maintaining said molten metal to a selected height in said bath, rotating said rolls to cause the ejection of solidified metal having a cast structure from the bight of the rolls without compressing said cast metal to any substantial extent, and providing the ends of the dams with a lower heat conductivity than the central zones of the rolls to control the thermal conditions so that the temperature of the solidified metal at the bight of the rolls is substantially the same in the zones adjacent to the dams and the intermediate zones of the molten bath.

15. The method of producing solid cast metal of substantially constant cross section throughout its length directly from a mass of molten metal which comprises establishing a bath of molten metal between a pair of adjacent and operatively associated rolls, providing a movable dam at each end of the rolls to maintain the molten metal in said bath; rotating said rolls to cause the ejection of solidified metal having a cast structure from the bight of the rolls, and providing dams with lower heat conductivity than the rolls without compressing said cast metal to any substantial extent to control the thermal conditions so that the temperature of the solidified metal at the bight of the rolls is substantially the same in the zones adjacent to the dams and the intermediate zones of the molten bath.

16. The method of producing solid cast metal of substantially constant cross section throughout its length directly from a mass of molten metal which comprises establishing a bath of molten metal between a pair of adjacent and operatively associated rolls, providing a movable dam at each end of the rolls to maintain the molten metal in said bath, rotating said rolls to cause the ejection of solidified metal having a cast structure from the bight of the rolls without compressing said cast metal to any substantial extent, and applying a heat insulating material to the dams to control the thermal conditions so that the temperature of the solidified metal at the bight of the rolls is substantially the same in the zones adjacent to the dams and the intermediate zones of the molten bath.

17. The method of producing solid cast metal of substantially constant cross section throughout its length directly from a mass of molten metal which comprises establishing a bath of molten metal between the bight of a pair of adjacent and operatively associated rolls, rotating said rolls to cause the ejection of solidified metal having a cast structure from the bight of the rolls without compressing said cast metal to any substantial extent, and introducing molten metal into said bath to replace the metal withdrawn from the bath without detrimentally affecting the solidified, cast metal adjacent to the rolls and at the bottom of the bath.

18. The method of producing solid cast metal of substantially constant cross section throughout its length directly from a mass of molten metal which comprises establishing a bath of molten metal between the bight of a pair of adjacent and operatively associated rolls, rotating said rolls to cause the ejection of solidified metal having a cast structure from the bight of the rolls without compressing said cast metal to any substantial extent, feeding molten metal to said bath, and dissipating the velocity of said metal while introducing the same into the molten bath without detrimentally affecting the solidified, cast metal adjacent to the rolls and at the bottom of the bath.

19. The method of producing solid cast metal of substantially constant cross section throughout its length directly from a mass of molten metal which comprises establishing a bath of molten metal between the bight of a pair of adjacent and operatively associated rolls, rotating said rolls to cause the ejection of solidified metal from the bight of the rolls without compressing said cast metal to any substantial extent, feeding molten metal to said bath, changing the direction of flow of the metal fed to the bath at a smaller distance from the surface of the bath than the depth of a bath to dissipate the velocity of said metal while introducing the same into a molten bath without detrimentally affecting the solidified metal adjacent to the rolls and at the bottom of the bath.

20. The method of producing solid cast metal of substantially constant cross section throughout its length directly from a mass of molten metal which comprises establishing a bath of molten metal between a pair of adjacent and operatively associated rolls, rotating said rolls to cause the ejection of solidified metal having a cast structure from the bight of the rolls without compressing said cast metal to any substantial extent, and regulating the power input applied to the rolls to an amount sufficient to eject solid, cast product and insufficient to subject the cast product to working by compression between the rolls.

21. The method of producing solid cast metal of substantially constant cross section throughout its length directly from a mass of molten metal which comprises establishing a bath of molten metal between a pair of adjacent and operatively associated rolls, rotating said rolls to cause the ejection of solidified metal having a cast structure from the bight of the rolls without compressing said cast metal to any substantial extent, and regulating the temperature in the molten bath in accordance with changes shown by a meter associated with the driving means for said rolls whereby only a cast product will be produced.

22. The method of producing solid cast metal of substantially constant cross section throughout its length directly from a mass of molten metal which comprises establishing a bath of molten metal between a pair of adjacent and operatively associated rolls, rotating said rolls to cause the ejection of solidified metal having a cast structure from the bight of the rolls without compressing said cast metal to any substantial extent, maintaining said molten metal to a selected height in said bath, and adding molten metal to said molten bath in amounts depending upon indications of a meter associated with the driving means for said rolls whereby only a cast product will be produced.

23. The method of producing solid cast metal of substantially constant cross section throughout its length directly from a mass of molten metal which comprises establishing a bath of molten metal between a pair of adjacent and operatively associated rolls, rotating said rolls to cause the ejection of solidified metal having a cast structure from the bight of the rolls without compressing said cast metal to any substantial extent maintaining said molten metal to a selected height in said bath, adding molten metal to said bath, and varying said additions of molten metal with changes indicated by a torque indicator operatively associated with the said rolls whereby only a cast product will be produced.

24. The method of casting molten metal directly to a solid, cast product of substantially uniform cross section comprising introducing molten metal between a pair of cooling rolls juxtaposed to define at one side of the points of tangency of said rolls a space adapted for the reception of said molten metal, maintaining said rolls at a temperature to solidify said metal contiguous said rolls and to produce a cast product of substantially uniform cross section, rotating said rolls to move the thus-solidified, cast metal between said cooling rolls without reducing the cross section of said cast metal to any substantial extent, and controlling the solidification of the molten metal whereby a product is ejected from said rolls having a cast structure and having a thickness substantially equal to the space between said rolls without said cast structure being subjected to work and being reduced in cross section to any substantial extent.

25. The method of casting molten metal directly to a solid, cast product comprising introducing molten metal between a pair of cooling rolls juxtaposed to define at one side of the region of tangency of said rolls a space adapted for the reception of said molten metal, cooling said rolls with a cooling fluid to a temperature to solidify said metal contiguous said rolls and to form a cast solid approximating the shape of the space between the rolls, rotating said rolls to move the thus-solidified, cast metal between said rolls without reducing the cross section of said cast metal to any substantial extent, and controlling the solidification of metal whereby a product is ejected from the rolls having a cast structure and having a thickness substantially equal to the space between said rolls without said cast structure being subjected to work and being reduced in cross section to any substantial extent.

26. The method of casting molten metal directly to a solid, cast product comprising introducing molten metal between a pair of cooling rolls juxtaposed to define at one side of the points of tangency of said cooling rolls a space adapted for the reception of said molten metal, holding said cooling rolls in spaced relation, maintaining said cooling rolls at a temperature to solidify said metal contiguous said rolls, rotating said cooling rolls to move the thus-solidified, cast metal between said cooling rolls without reducing the cross section of said cast metal to any substantial extent, and controlling the solidification whereby a product is ejected from the rolls having a cast structure and having a thickness substantially equal to the space between said rolls without said cast structure being subjected to work and being reduced in cross section to any substantial extent.

27. The method of casting molten metal directly to a solid, cast product comprising continuously introducing molten metal between a pair of cooling rolls juxtaposed to define at one side of the points of tangency of said rolls a space adapted for the reception of said molten metal, continuously maintaining said rolls at a temperature to solidify cast metal contiguous said rolls, continuously rotating said rolls to move the thus-solidified, cast metal between said rolls without reducing the cross section of said cast metal to any substantial extent, and controlling the rotation of said rolls whereby a product is ejected from the rolls having a cast structure and having a thickness substantially equal to the space between said rolls without said cast structure being subjected to work and reduced in cross section to any substantial extent.

28. The method of casting molten metal directly to a solid cast product comprising introducing molten metal between a pair of cooling rolls juxtaposed to define at one side of the points of tangency of said rolls a space adapted for the reception of said molten metal, cooling said rolls to a temperature to solidify cast metal between said rolls, rotating said rolls to move the thus-solidified, cast metal between said rolls without reducing the cross section of said cast metal to any substantial extent, varying the speed of rotation of said rolls to vary the duration of such solidification of cast metal, and controlling the variation in speed whereby a product is ejected from the rolls having a cast structure and having a thickness substantially equal to the space between said rolls without said cast structure being subjected to work and being reduced in cross section to any substantial extent.

29. The method of casting molten metal directly to a solid, cast product comprising introducing molten metal between a pair of cooling rolls juxtaposed to define at one side of the points of tangency of said rolls a space adapted for the reception of said molten metal, cooling said rolls with water to a temperature to solidify cast metal between said rolls, rotating said rolls to move the thus-solidified, cast metal between said rolls without reducing the cross section of said cast metal to any substantial extent, and controlling the solidification whereby a product is ejected from said rolls having a cast structure and having a thickness substantially equal to the space between said rolls without subjecting said cast structure to work and to reduction in cross section to any substantial extent.

30. The method of casting molten metal directly to a solid, cast product comprising introducing molten metal between a pair of cooling rolls juxtaposed to define at one side of the points of tangency of said rolls a space adapted for the reception of said molten metal therein to form an open lake of said molten metal, maintaining said rolls at a temperature to solidify cast metal between said rolls, rotating said rolls to move the thus-solidified, cast metal between said rolls without reducing the cross section of said cast metal to any substantial extent, varying the depth of metal in said lake to vary the duration of solidification and coordinating the solidification whereby a product is ejected from said rolls having a cast structure and having a thickness substantially equal to the space between said rolls without subjecting said cast structure to work and to reduction in cross section to any substantial extent.

31. The method of casting molten metal directly to a solid cast product comprising introducing molten metal between a pair of cooling rolls juxtaposed to define at one side of the points of tangency of said rolls a space adapted for the reception of said molten metal, supplying molten metal from a height less than the depth of molten metal to said space to maintain a predetermined level of metal therein, maintaining said rolls at a temperature to solidify cast metal between said rolls, rotating said rolls to move the thus-solidified, cast metal between said rolls without reducing the cross section of said cast metal to any substantial extent, and controlling the solidification whereby a product is ejected from the rolls having a cast structure and having a thickness substantially equal to the space between said rolls without subjecting said cast metal to work and to reduction in cross section to any substantial extent.

32. The method of casting molten metal directly to a solid, cast metal comprising introducing molten metal between a pair of cooling rolls juxtaposed to define at one side of the points of tangency of said rolls a space adapted for the reception of said molten metal; maintaining a yieldable end dam mounted at each end of the rolls, cooling said rolls to a temperature to substantially solidify cast metal contiguous said rolls, rotating said rolls to move the thus-solidified, cast metal between said rolls without reducing the cross section of said cast metal to any substantial extent, and controlling the solidification whereby a product is ejected from said rolls having a cast structure and having a thickness substantially equal to the space between said rolls without subjecting said cast structure to work and to reduction in cross section to any substantial extent.

33. The method of casting molten metal directly to a solid, cast product comprising introducing molten metal between a pair of cooling rolls juxtaposed to define at one side of the points of tangency of said rolls a space adapted for the reception of said molten metal, maintaining a moving, yieldable support mounted at each end of the pair of rolls to hold a lake of molten metal between said rolls, cooling said rolls to a temperature to substantially solidify cast metal contiguous said rolls, rotating said rolls to move the thus-solidified, cast metal between said rolls without reducing the cross section of said cast metal to any substantial extent, and controlling the solidification whereby a product is ejected from said rolls having a cast structure and having a thickness substantially equal to the space between said rolls without subjecting said cast structure to work and to reduction in cross section to any substantial extent.

34. The method of casting molten metal directly to a solid, cast product comprising introducing molten metal between a pair of cooling rolls juxtaposed to define at one side of the point of tangency of said rolls a space adapted for reception of said molten metal, maintaining said rolls at a temperature to solidify and cast the metal in the bight of the rolls, driving said rolls by means of a motor and controlling the solidification by means of an indicator operatively associated with said motor whereby a product is ejected from said rolls having a cast structure and having a thickness substantially equal to the space between said rolls without subjecting said cast structure to work and to reduction in cross section to any substantial extent.

35. The method of casting molten metal directly to a solid, cast product comprising introducing molten metal between a pair of cooling surfaces juxtaposed to define at one side of the point of tangency of said rolls a space adapted for the reception of said molten metal, maintaining said cooling surfaces at a temperature to solidify cast metal in the bight of the cooling surfaces, driving said cooling surfaces with an electric motor, and controlling the solidification with a torque device operatively associated with said electric motor whereby a product is ejected from said cooling surfaces having a cast structure and having a thickness substantially equal to the space between said cooling surfaces without subjecting said cast structure to work, and to reduction in cross section to any substantial extent.

36. The method of casting molten metal directly to a solid, cast product comprising introducing molten metal between a pair of cooling rolls juxtaposed to define at one side of the points of tangency of said rolls a space adapted for the reception of said molten metal, surrounding said molten metal held between said rolls with a reducing atmosphere, maintaining said rolls at a temperature to solidify cast metal contiguous to said rolls, rotating said rolls to move the thus-solidified cast metal between said rolls, and controlling the solidification by varying one or more of the factors effecting the extent of solidification, such as the speed of the rolls, the temperature of the lake, the extent of contact between the lake and the rolls, and the temperature of the roll surfaces in contact with the lake, to reduce solidification when the load increases and increase solidification when the load decreases whereby a product is ejected from said rolls having a cast structure and having a thickness substantially equal to the space between said rolls without subjecting said cast structure to work and to reduction in cross section to any substantial extent.

37. The method of casting molten metal directly to a solid, cast product comprising introducing molten metal between a pair of cooling rolls juxtaposed to define at one side of the points of tangency of said rolls a space adapted for the reception of said molten metal, compensating excess cooling at the ends of the rolls, maintaining said rolls at a temperature to solidify cast metal contiguous to said rolls, rotating said rolls to move the thus-solidified, cast metal between said rolls without reducing the cross section of said cast metal to any substantial extent, and controlling the solidification whereby a product is ejected from said rolls having a cast structure and having a thickness substantially equal to the space between said rolls without subjecting said cast structure to work and to reduction in cross section to any substantial extent.

38. The method of casting molten metal directly to a solid, cast product comprising introducing molten metal between a pair of cooling surfaces juxtaposed to define at one side of the points of tangency of said cooling surfaces a space adapted for the reception of said molten metal, applying heat insulation to the ends of the cooling surfaces to prevent excess cooling, maintaining said cooling surfaces at a temperature to solidify and cast metal contiguous to said cooling surfaces, rotating said cooling surfaces to move the thus-solidified, cast metal between said cooling surfaces without reducing the cross section of said cast metal to any substantial extent, and controlling the solidification whereby a product is ejected from said rolls having a cast structure and having a thickness substantially equal to the space between said cooling surfaces without subjecting said cast structure to work and to reduction in cross section to any substantial extent.

39. The method of casting molten metal directly to a solid, cast product comprising introducing molten metal between a pair of cooling rolls juxtaposed to define at one side of the points of tangency of said rolls a space adapted for the reception of said molten metal, arranging the shape of said rolls in such a manner that the space adjacent to the ends of the rolls is wider to compensate for excess cooling at the ends of the rolls, maintaining said rolls at a temperature to solidify cast metal contiguous to said rolls, rotating said rolls to move the thus-solidified, cast metal between said rolls, and controlling the solidification whereby a product is ejected from said rolls having a cast structure and having a thickness substantially equal to the space between said rolls without subjecting said cast structure to work and to reduction in cross section to any substantial extent.

40. The method of casting molten metal directly to a solid, cast product of substantially uniform cross section comprising introducing molten metal between a pair of cooling rolls juxtaposed to define at one side of the points of tangency of said rolls a space adapted for the reception of said molten metal, mounting baffle means above said space to baffle and distribute the incoming molten metal, maintaining said rolls at a temperature to solidify said metal contiguous said rolls and to produce a cast product of substantially uniform cross section, rotating said rolls to move the thus solidified, cast metal between said rolls without reducing the cross section of said cast metal to any substantial extent, and controlling the solidification of metal whereby a product is ejected from said rolls having a cast structure and having a thickness substantially equal to the space between said rolls without said cast structure being subjected to work and to reduction in cross section to any substantial extent.

41. The method of casting molten metal directly to a solid, cast product of substantially uniform cross section comprising introducing molten metal between a pair of cooling surfaces juxtaposed to define at one side of the points of tangency of said cooling surfaces a space adapted for the reception of said molten metal, providing yieldable end dams at and operatively associated with the said pair of cooling surfaces, maintaining said cooling surfaces at a temperature to solidify said metal contiguous said cooling surfaces and to produce a cast product of substantially uniform cross section, rotating said cooling surfaces to move the thus solidified, cast metal between said cooling surfaces without reducing the cross section of said cast metal to any substantial extent, and controlling the solidification of metal whereby a product is ejected from said cooling surfaces having a cast structure and having a thickness substantially equal to the space between said cooling surfaces without said cast structure being subjected to work and to reduction in cross section to any substantial extent.

42. The method of casting molten metal directly to a solid, cast product of substantially uniform cross section comprising introducing molten metal between a pair of cooling rolls juxtaposed to define at one side of the points of tangency of said rolls a space adapted for the reception of said molten metal, applying live steam to said rolls at a temperature such to solidify said metal contiguous said rolls and to produce a cast product of substantially uniform cross section, rotating said rolls to move the thus solidified, cast metal between said rolls without reducing the cross section of said cast metal to any substantial extent, and controlling the solidification of metal whereby a product is ejected from said rolls having a cast structure and having a thickness substantially equal to the space between said rolls without said cast structure being subjected to work and to reduction in cross section to any substantial extent.

43. The method of casting molten metal directly to a solid, cast product of substantially uniform cross section comprising introducing molten metal between a pair of cooling rolls juxtaposed to define at one side of the points of tangency of said rolls a space adapted for the reception of said molten metal, providing rotatable and yieldable end dams mounted at each end of said rolls and capable of rotating to cut off extruded metal, maintaining said rolls at a temperature to solidify said metal contiguous said rolls and to produce a cast product of substantially uniform cross section, rotating said rolls to move the thus solidified, cast metal between said rolls without reducing the cross section of said cast metal to any substantial extent, and controlling the solidification of metal whereby a product is ejected from said rolls having a cast structure and having a thickness substantially equal to the space between said rolls without said cast structure being subjected to work and to reduction in cross section to any substantial extent.

44. The method of casting molten metal directly to a solid, cast product of substantially uniform cross section comprising introducing molten metal between a pair of cooling rolls juxtaposed to define at one side of the points of tangency of said rolls a space adapted for the reception of said molten metal, maintaining said rolls at a temperature to solidify said metal contiguous said rolls and to produce a cast product of substantially uniform cross section, reducing the conduction of heat at the edges of said rolls, rotating said rolls to move the thus solidified, cast metal between said rolls without reducing the cross section of said cast metal to any substantial extent, and controlling the solidification of metal whereby a product is ejected from said rolls having a cast structure and having a thickness substantially equal to the space between said rolls without said cast structure being subjected to work and to reduction in cross section to any substantial extent.

45. The method of casting molten metal directly to a solid, cast product of substantially uniform cross section comprising introducing molten metal between a pair of cooling rolls juxtaposed to define at one side of the points of tangency of said rolls a space adapted for the reception of said molten metal, providing a yieldable end dam mounted at each end of said rolls and having a low heat conductivity, maintaining said rolls at a temperature to solidify said metal contiguous said rolls and to produce a cast product of substantially uniform cross section, rotating said rolls to move the thus solidified, cast metal between said rolls without reducing the cross section of said cast metal to any substantial extent, and controlling the solidification of metal whereby a product is ejected from said rolls having a cast structure and having a thickness substantially equal to the space between said rolls without said cast structure being subjected to work and to reduction in cross section to any substantial extent.

46. The method of casting molten metal directly to a solid, cast product of substantially uniform cross section comprising introducing molten metal between a pair of cooling rolls juxtaposed to define at one side of the points of tangency of said rolls a space adapted for the reception of said molten metal, maintaining said rolls at a temperature to solidify said metal contiguous said rolls and to produce a cast product of substantially uniform cross section, applying heat at the end zones of said rolls, rotating said rolls to move the thus solidified, cast metal between said rolls without reducing the cross section of said cast metal to any substantial extent, and controlling the solidification of metal whereby a product is ejected from said rolls having a cast structure and having a thickness substantially equal to the space between said rolls without said cast structure being subjected to work and to reduction in cross section to any substantial extent.

47. The method of casting molten metal directly to a solid, cast product of substantially uniform cross section comprising introducing molten metal between a pair of cooling rolls juxtaposed to define at one side of the points of tangency of said rolls a space adapted for the reception of said molten metal, maintaining said rolls at a temperature to solidify said metal contiguous said rolls and to produce a cast product of substantially uniform cross section, rotating said rolls to move the thus solidified, cast metal between said rolls without reducing the cross section of said cast metal to any substantial extent, and controlling the solidification of metal by regulating the speed of said rolls in accordance with the indications of a torque indicator whereby a product is ejected from said rolls having a cast structure and having a thickness substantially equal to the space between said rolls without said cast structure being subjected to work and to reduction in cross section to any substantial extent.

48. The method of casting molten metal directly to a solid, cast product of substantially uniform cross section comprising introducing molten metal between a pair of cooling rolls juxtaposed to define at one side of the points of tangency of said rolls a space adapted for the reception of said molten metal, maintaining said rolls at a temperature to solidify said metal contiguous said rolls and to produce a cast product of substantially uniform cross section, cooling said rolls internally and externally, rotating said rolls to move the thus solidified, cast metal between said rolls without reducing the cross section of said cast metal to any substantial extent, and controlling the solidification of metal whereby a product is ejected from said rolls having a cast structure and having a thickness substantially equal to the space between said rolls without said cast structure being subjected to work and to reduction in cross section to any substantial extent.

CLARENCE W. HAZELETT.